(12) United States Patent
Lenzi et al.

(10) Patent No.: US 9,736,397 B2
(45) Date of Patent: Aug. 15, 2017

(54) METHOD AND APPARATUS FOR CONTROL OF CLOSED CAPTIONING

(71) Applicant: CAPTION COLORADO LLC, Greenwood Village, CO (US)

(72) Inventors: Umberto Lenzi, Mill Creek, WA (US); Wesley Long, Aurora, CO (US)

(73) Assignee: VITAC CORPORATION, Boulder, CO (US)

( * ) Notice: Subject to any disclaimer, the term of this patent is extended or adjusted under 35 U.S.C. 154(b) by 0 days.

(21) Appl. No.: 14/848,877

(22) Filed: Sep. 9, 2015

(65) Prior Publication Data

US 2015/0381906 A1 Dec. 31, 2015

Related U.S. Application Data

(63) Continuation of application No. 14/338,377, filed on Jul. 23, 2014, now Pat. No. 9,137,582, which is a continuation of application No. 13/950,023, filed on Jul. 24, 2013, now Pat. No. 8,826,326, which is a continuation of application No. 10/094,689, filed on Mar. 8, 2002, now Pat. No. 8,522,267.

(51) Int. Cl.
  *H04N 21/478* (2011.01)
  *H04N 5/278* (2006.01)
  *H04N 7/088* (2006.01)
  *H04N 21/488* (2011.01)
  *H04N 7/10* (2006.01)

(52) U.S. Cl.
  CPC .......... *H04N 5/278* (2013.01); *H04N 7/0885* (2013.01); *H04N 7/10* (2013.01); *H04N 21/478* (2013.01); *H04N 21/4884* (2013.01)

(58) Field of Classification Search
  USPC .................................. 725/32, 40
  See application file for complete search history.

(56) References Cited

U.S. PATENT DOCUMENTS

| 5,508,754 A | 4/1996 | Orphan |
| 5,805,153 A | 9/1998 | Nielsen |
| 5,995,155 A * | 11/1999 | Schindler .......... H04N 5/44543 348/460 |

(Continued)

OTHER PUBLICATIONS

EEG Enterprises, Inc., Smart Encoder III Model EN 470, May 1998, US.

(Continued)

*Primary Examiner* — Kieu Oanh T Bui
(74) *Attorney, Agent, or Firm* — Dorsey & Whitney LLP

(57) ABSTRACT

A system for performing closed captioning enables a caption prepared remotely by a captioner to be repositioned by someone other than the captioner, such as by a program originator. This capability is particularly useful when, for example, the program originator wishes to include a banner in a video but also wishes to avoid having a closed caption interfere with the banner. In one illustrative system, the program originator is a broadcast station that includes a conventional encoder and a broadcast station computer. In one arrangement, control data generated at the station computer is incorporated into the caption data by the station computer. In another arrangement, the control data is sent from the station computer to the captioner computer, which incorporates the control data into the caption data.

13 Claims, 16 Drawing Sheets

(56) References Cited

U.S. PATENT DOCUMENTS

| | | | |
|---|---|---|---|
| 6,895,166 B1* | 5/2005 | Schriebman | G11B 27/034 348/E5.06 |
| 7,006,881 B1 | 2/2006 | Hoffberg et al. | |
| 7,050,109 B2 | 5/2006 | Safadi et al. | |
| 7,540,378 B2 | 6/2009 | Gallagher | |
| 2002/0075403 A1 | 6/2002 | Barone | |
| 2002/0122136 A1 | 9/2002 | Safadi et al. | |
| 2002/0196370 A1 | 12/2002 | Dagtas et al. | |
| 2003/0169369 A1 | 9/2003 | Kahn | |

OTHER PUBLICATIONS

EEG Enterprises, Inc., The CB411 Caption Data Bridge, pp. 1-5, Jul. 2000, US.

"35 USC 112(a)", 35 USC 112(a).

"Appeal Brief dated Jan. 9, 2012", Appeal Brief dated Jan. 9, 2012, U.S. Appl. No. 10/094,689, 44 pages.

"Response to Final Office Action", Response to US Final Office Action dated Oct. 2, 2009, U.S. Appl. No. 10/094,689, 16 pages.

"Response to Final Office Action dated Nov. 9, 2010", Response to US Final Office Action dated Nov. 9, 2010, U.S. Appl. No. 10/094,689, 15 pages.

"Closed Caption Decoder Requirements", FCC Title 47 CFR 15.119, Chapter 1—Federal Communications Commission, revised Oct. 1, 2000, 1-16.

"TurboCAT", Cheetah International, http://www.caption.com/English/Products/TubroCT/ TurboCAT.html., printed Dec. 19, 2011, 1-13.

"Response to Non-Final Office Action", Response to Non-Final Office Action dated Feb. 12, 2013, U.S. Appl. No. 10/094,689, 13 pages.

"Response to US Non-Final Office Action", Response to US Non-Final Office Action dated Dec. 15, 2008, U.S. Appl. No. 10/094,689, 16 pages.

"Response to US Non-Final Office Action", Response to US Non-Final Office Action dated Jul. 27, 2011, U.S. Appl. No. 10/094,689, 20 pages.

"Response to US Non-Final Office Action", Response to US Non-Final Office Action dated Jun. 26, 2012, U.S. Appl. No. 10/094,689, 14 pages.

"Response to US Non-Final Office Action", Response to US Non-Final Office Action dated Jun. 30, 2010, U.S. Appl. No. 10/094,689, 15 pages.

"US Final Office Action", US Final Office Action dated Jul. 2, 2009, U.S. Appl. No. 10/094,689, 24 pages.

"US Final Office Action", US Final Office Action dated Oct. 6, 2011, U.S. Appl. No. 10/094,689, 26 pages.

"US Final Office Action", US Final Office Action dated Sep. 9, 2010, US Final Office Action, 25 pages.

"US Non-Final Office Action", US Non-Final Office Action dated Aug. 27, 2012, U.S. Appl. No. 10/094,689, 26 pages.

"US Non-Final Office Action", US Non-Final Office Action dated Mar. 27, 2012, U.S. Appl. No. 10/094,689, 26 pages.

"US Non-Final Office Action", US Non-Final Office Action dated Mar. 30, 2010, U.S. Appl. No. 10/094,689, 25 pages.

"US Non-Final Office Action", US Non-Final Office Action dated Apr. 27, 2011, U.S. Appl. No. 10/094,689, filed Mar. 8, 2002, 25 pages.

"US Non-Final Office Action", US Non-Final Office Action dated Jun. 13, 2008, U.S. Appl. No. 10/094,689, filed Mar. 8, 2002, 23 pages.

"US Non-Final Office Action", US Non-Final Office Action dated Mar. 27, 2012, U.S. Appl. No. 10/094,689, filed Mar. 8, 2002, 27 pages.

* cited by examiner

METHOD AND APPARATUS FOR CONTROL OF CLOSED CAPTIONING

RELATED APPLICATIONS

This application is a continuation application of U.S. application Ser. No. 14/338,377, filed Jul. 23, 2014, which is a continuation of U.S. application Ser. No. 13/950,023, filed Jul. 24, 2013, which issued as U.S. Pat. No. 8,826,326, on Sep. 2, 2014, which is a continuation of U.S. application Ser. No. 10/094,689, filed Mar. 8, 2002, which issued as U.S. Pat. No. 8,522,267, on Aug. 27, 2013, which is herein incorporated by reference in its entirety.

BACKGROUND OF THE INVENTION

Field of the Invention

The present invention relates to closed captioning, and more particularly to control of various aspects of closed captioning by other than the captioner.

Description of Related Art

A video caption is a title, short explanation, or description that typically accompanies a pictorial work, and in particular a video work. Open captions are always visible to the viewer while closed captions are visible to the viewer upon activation of a suitable decoder. Closed captioning includes the type of captioning governed by 47 C.F.R. §15.119. Captions may be imposed on a video signal live as the signal is generated, or during post-production of the work. Live closed captioning, which is commonly done for any live programming such as televised news programs and sports events, typically uses text created in real time as the video program is broadcast, or a combination of real time text and prepared script. Real time captioning typically involves a captioner who writes the caption as it is broadcast using any suitable text entry technique.

A stenocaptioner is a specific type of captioner who uses a shorthand keyboard to enter phonetic shorthand into a computer, which translates the phonetic shorthand into characters (letters, numbers, symbols and spaces) in the desired language and communicates the characters and various control codes typically to a program originator using a modem. The program originator, which typically is a broadcast station, a cable operator, a municipality, an audio-visual educational presenter, a public access originator, a satellite uplink station, and so forth, encodes the video carrying the program with the caption using a specific type of encoder known as a closed-caption encoder. Closed caption encoders are well known in the art, and include the various models of SmartEncoder encoder and the model EN470 encoder, which are available from Computer Prompting & Captioning Co. of Rockville, Md.

The closed caption encoded program ultimately is received by a viewer. The closed caption is not visible on the viewer's television screen unless the viewer uses a closed-caption decoder. Such decoders are well known in the art.

An example of a conventional system for performing real time closed captioning at a broadcast station is shown in FIG. 1. The captioner typically writes the caption using a shorthand keyboard 102 that is cabled to a personal computer ("PC") 100. The captioner PC 100 typically is a general purpose computer running a suitable captioning application software such as the TurboCAT software available from Cheetah International, Inc. of Tucson, Ariz. The resulting caption data, which is a combination of caption characters and control data, typically is transmitted to an encoder 132 typically located at a broadcast station using any desired transmission agency. The transmission agency shown in FIG. 1 is a direct modem-to-modem transmission agency using, for example, respective modems 112 and 130 and a dial-up connection 120 to maintain a direct modem-to-modem connection. Although shown as a separate device in FIG. 1, the modem 130 may be incorporated in the encoder 132. The caption data is added to the video signal by the encoder 132, and the video signal is combined with audio (not shown) and transmitted using a transmission agency such as conventional radio frequency ("RF") broadcast 134, cable or satellite transmission (not shown), and so forth. The transmission containing the video signal and the caption data is received by the viewer's viewing device, a popular example of which is an standard television set 140 which includes a decoder that decodes the transmission and displays the caption on the viewer's screen along with the video work. All television sets of a certain size produced in the United States or imported into the United States must have a built-in decoder and decoder controls.

Typically, closed captions for video works are inserted into the line 21 blanking interval, and upon being decoded give the impression that they are part of the picture. The default placement for closed captions tends to be the two or three lines at the bottom of a video screen, although known captioning software allows a captioner to select the number of lines and the placement of those lines on the video screen. Unfortunately, the size and location of the closed caption typically cannot be specified at the broadcast station, which can result in some portion of the picture becoming blocked and invisible to the viewer under certain circumstances. For example, severe weather notifications and news flashes may from time to time appear in the picture as a type of open graphic known as a banner in the same area of a video screen as closed captions. If the closed captions are not moved elsewhere or suppressed, the banner will be blocked from full view. FIG. 2 shows a normal video of a news conference during which a sever storm warning banner is displayed at the bottom of the screen. Closed captioning is turned off. FIG. 3 shows the same news conference being viewed with closed captioning turned on, just prior to display of the severe storm warning banner. The speaker is saying "Just one more question, please. I will take the next question from Mr. Smith." A two line caption accurately capturing this statement appears at the bottom of the screen. However, at the next instant the station displays the sever storm warning banner at the bottom of the screen, as shown in FIG. 4. While this may be done in a variety of different ways, one common technique is to merge a video of the banner with the main video to create a composite video signal for display. Unfortunately, as can be seen by comparing FIG. 4 with FIG. 2, the caption obscures much if not all of the warning banner, thereby denying the viewer notification of critical information.

Some closed captioning encoders include the capability of automatically repositioning a closed caption a predetermined number of lines upon receipt of a signal from the Emergency Alert System. However, the program originator has no control over this repositioning function except to activate or deactivate it, and the repositioning function is ineffective on other types of open graphics.

While the broadcaster could try to telephone the captioner and instruct the captioner to resize and/or relocate the caption in anticipation of the banner, the captioner usually is entirely focused on transcribing the oral material and would be unlikely to answer the telephone. Similarly, the captioner likely would not be closely monitoring the televised image while performing a transcription, since such close monitoring would be a distraction. Moreover, even if the captioner were to monitor the televised image to detect the appearance of a banner message and to reposition the caption accordingly, the banner message would still be obscured for the time required for the captioner to notice the message banner and enter the repositioning instructions. Hence, a need exists for a way to reposition the caption more or less contemporaneously with the display of a message banner, without disrupting the captioner's transcription of the oral content of the audio-video work.

BRIEF SUMMARY OF THE INVENTION

Advantageously, one or more embodiments of the present invention provide for control of various aspects of a caption such as, for example, the number of caption lines and the placement of the caption window, from an encoding site such as a broadcast station.

These and other advantages are respectively realized by one or more embodiments of the present invention. One embodiment of the present invention is an apparatus for enabling a user thereof to exert control of various closed caption display aspects of caption text, comprising a user input component for generating a plurality of selectively operable control elements respectively representative of the closed caption display aspects; a component responsive to selective operation of any of the control elements for generating first control data corresponding to at least one of the closed caption display aspects; and a first output for supplying the first control data apart from the caption text.

Another embodiment of the present invention is an apparatus for enabling a user thereof to exert control of various closed caption display aspects of caption text contained in caption data, comprising a first input for receiving the caption data; a user input component for generating a plurality of selectively operable control elements respectively representative of the closed caption display aspects; a component responsive to selective operation of any of the control elements for generating control data corresponding to at least one of the closed caption display aspects; a component responsive to the first input and to the control data generating component for incorporating the control data into the caption data to create modified caption data; and a first output for supplying the modified caption data.

A further embodiment of the present invention is an apparatus for implementing control of various closed caption display aspects of caption text contained in caption data by a person other than a captioner, comprising a first input for receiving first control data apart from the caption data; a component responsive to the first input for incorporating the first control data received at the first input into the caption data to create modified caption data; and a first output for supplying the modified caption data.

Yet another embodiment of the present invention is a system for enabling a program director at a closed captioning encoding site to exert control of various closed caption display aspects of caption text created by a captioner and contained in caption data. The system comprises a first apparatus located at the program origination site, a second apparatus removed from the program origination site; and a communications link coupling the first apparatus and the second apparatus. The first apparatus comprises a monitor; a plurality of selectively operable graphic control elements displayed on the monitor, the control elements being respectively representative of the closed caption display aspects and generating upon operation first control data corresponding to at least one of the closed caption display aspects; a first input; and a first output for supplying the first control data apart from the caption text. The second apparatus comprises a second input for receiving supplemental control data from the first output; a programmable processor responsive to the second input for incorporating the first control data received at the second input into the caption data to create modified caption data; and a second output for supplying the modified caption data to the first input. The first apparatus further comprises a third output for supplying the modified caption data received at the first input.

A further embodiment of the present invention is a method for enabling a user thereof to exert control of various closed caption on text, comprising generating a plurality of selectively operable control elements respectively representative of the closed caption display aspects; generating first control data corresponding to at least one of the closed caption aspects in response to a selective operation of any of the control elements; and supplying the first control data apart from the caption text.

Yet another embodiment of the present invention is a method for enabling a user thereof to exert control of various closed caption display aspects of caption text contained in caption data, comprising receiving the caption data; generating a plurality of selectively operable control elements respectively representative of the closed caption display aspects; generating control data corresponding to at least one of the closed caption display aspects, in response to selective operation of any of the control elements; incorporating the control data into the caption data to create modified caption data; and supplying the modified caption data.

Another embodiment of the present invention is a method for implementing control of various closed caption display aspects of caption text contained in caption data by a person other than a captioner, comprising receiving first control data apart from the caption data; incorporating the first control data into the caption data to create modified caption data; and supplying the modified caption data.

A further embodiment of the present invention is a method for processing caption data comprising receiving caption data, the caption data including control data; removing the control data from the caption data to create modified caption data; and supplying the modified caption data.

DETAILED DESCRIPTION OF THE INVENTION, INCLUDING THE BEST MODE

Figure 5:
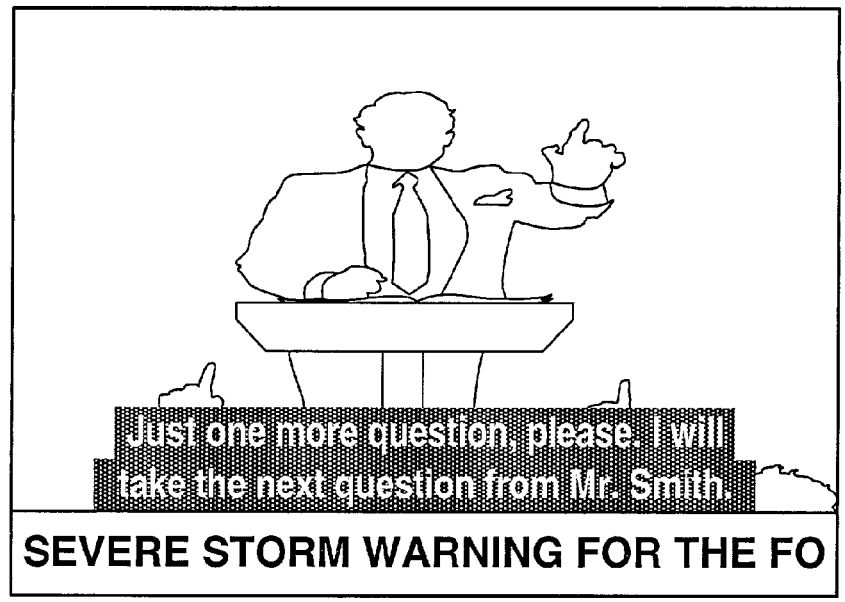
FIG. 5 is a pictorial representation of a video screen containing a banner and a closed caption that does not interfere with the banner, in accordance with the present invention.

By enabling a person other than a captioner to control various aspects of a closed caption such as the number of caption lines and the placement of the caption window, interference between the closed caption and an open graphic or, more generally, any section of a displayed video image may be avoided. FIG. 5 shows that the closed caption "Just one more question, please. I will take the next question from Mr. Smith" is positioned a sufficient distance from the bottom of the screen to permit a severe storm warning banner to be displayed without any interference from the closed caption. The closed caption is repositioned without the captioner's involvement, and particularly without any need to disrupt the captioner's transcription of the oral content of the audio or audio-video work.

Figure 6:
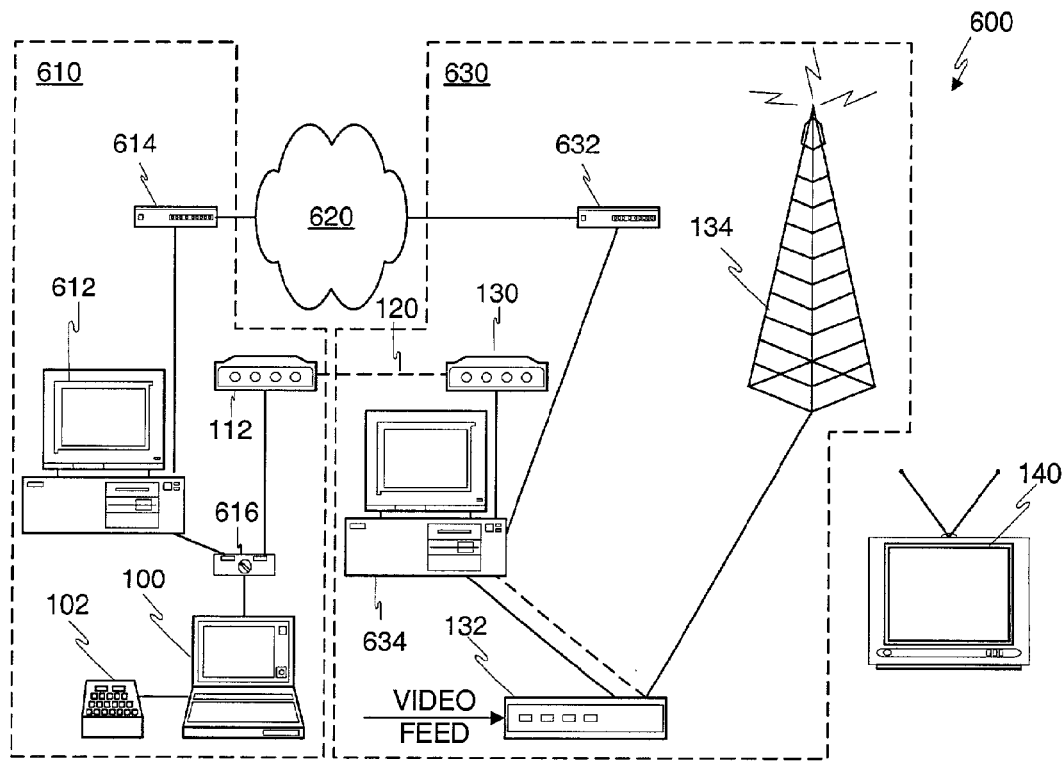
FIG. 6 is a block schematic diagram of a closed captioning system in accordance with the present invention.

A illustrative system 600 for performing real time closed captioning using a conventional closed captioning encoder is shown in FIG. 6. The system 600 enables various aspects of a closed caption prepared at a captioner's site 610 to be controlled by someone other than the captioner, for example by a program director at a program origination site such as broadcast station 630, before being transmitted in a video signal from the broadcast station 630 to a viewer's television set 140. This capability is particularly useful when, for example, the broadcast station wishes to display a warning banner or more generally, wishes any open graphic or indeed any particular area of the video image to be visible to the viewer without being obscured by the closed caption.

The captioner typically writes the caption using the shorthand keyboard 102 that is cabled to the captioner's computer 100. Although shown as a laptop model in FIG. 6, the captioner's computer 100 may be any dedicated computer, programmable workstation, or general purpose programmable computer such as a desktop or laptop personal computer of the type available from the IBM Corporation of White Plains, N.Y., or Apple Computer Inc. of Cupertino, Calif., operating under any suitable operating system and running any suitable captioning application software that is modified or written to accept remotely generated caption commands. Any other type of computer or computing device including hardwired and dedicated captioning devices may also be used if desired. Digital switchbox 616, which is any type of suitable digital switch, manual or electronic, permits the captioner to select between conventional closed captioning wherein the broadcast station has no control over the various aspects of the closed captions, and improved closed captioning wherein the broadcast station has control over various aspects of the closed caption. Instead of the digital switchbox 616, different ports of the computer 100 may be used if desired.

Conventional closed captioning is implemented by having the caption data—a combination of caption characters and control data—transmitted from the captioning program running on the computer 100 through the switchbox 616 and a computer 634 (configured for pass through) to the conventional encoder 132 typically located at a broadcast station using any desired transmission agency. One type of transmission agency shown in FIG. 6 is a direct transmission agency using, for example, respective modems 112 and 130, and a dial-up connection 120 to maintain a direct modem-to-modem connection. The caption data is added to the blanking interval of the video signal by the encoder 132, and the video signal from the encoder 132 is combined with an audio signal and is transmitted using a transmission agency such as conventional radio frequency ("RF") broadcast 134, or cable or satellite transmission (not shown), and so forth. The transmission containing the audio-video signal and the caption data is received by the viewer's viewing device, a popular example of which is a standard television set 140 which includes a decoder that decodes the transmission and displays the caption on the viewer's screen along with the video work. Another suitable transmission agency is the Internet, the video signal from the encoder 132 being digitized by any suitable device (not shown) and streamed or otherwise transmitted to a viewer's computer or set top box or any other suitable device (not shown) via the Internet. Suitable digitizers, streaming systems, and viewer devices are well known in the art.

Improved closed captioning is implemented by having the caption data from a captioning program running on the computer 100 directed through the switchbox 616 to a "bridge" program running on the computer 612, and directed from the bridge program to a control program running on a computer 634 located at the broadcast station 630 using any desired transmission agency. Although shown as desktop models in FIG. 6, the computer 612 at the captioner's site 610 and the computer 634 at the broadcast station 630 may be any programmable workstation or programmable general purpose desktop, laptop or workstation computer such as a personal computer of the type available from the IBM Corporation of White Plains, N.Y., or Apple Computer Inc. of Cupertino, Calif., operating under any suitable operating system. Any other type of computer or computing device including hardwired and dedicated encoding devices may also be used if desired, including devices having integrated encoding and computer functionality. The transmission agency shown in FIG. 6 is the Internet 620 which is accessed by Internet access devices 614 and 632. Internet access devices 614 and 632 may be any type of device for Internet access, including dial-up modems, cable or digital subscriber line ("DSL") connection devices, routers, and so forth. Any suitable Internet transmission technique may be used, including transmissions managed by a server or peer-to-peer transmissions. While using the Internet as a transmission agency results in significant cost savings over direct modem-to-modem communications over a telephone line, such direct communications and transmissions over other types of networks, public or private, may also be used if desired. Depending on the embodiment of the control program, the caption data may be passed through the computer 634 to the encoder 132, where it is added to the blanking interval of the video signal, or may have its control data supplemented or modified by the control program before being furnished to the encoder 132. The video signal from the encoder 132, which contains the closed caption data, is combined with audio and is transmitted using any desired transmission agency, including, for example, conventional RF broadcast 134 and cable or satellite transmission (not shown) or the Internet (not shown). Optionally, the video signal from the encoder, which contains the closed caption data, may be furnished to a video frame grabber in the computer 634, as represented by the dashed line between the encoder 132 and the computer 634. Any desired medium may be used for communications between the computer 634 and the encoder 132, including serial, parallel, and internet protocol. The transmission containing the audio-video signal with the caption data is received by the viewer's television set 140 (or computer or set top box or other suitable device), which decodes the transmission and displays the decoded closed caption on the viewer's screen along with the video work.

Although FIG. 6 shows the computer 612 as being located at the captioner's site 610, the computer 612 running the bridge program may alternatively be located at a third party site such as a service center. In the illustrative system 700 shown in FIG. 7, the computer 702 at the captioner's site 710 is similar to the computer 100 but runs a captioning program that is capable of accessing the Internet through the Internet access device 614. Computer 712, which is used instead of the computer 612, is at a site other than either the captioner's site 710 or the broadcast station 630 and accesses the Internet through an Internet access device 714. Computer 634 at the broadcast station accesses the Internet through the Internet access device 632.

Figure 8:
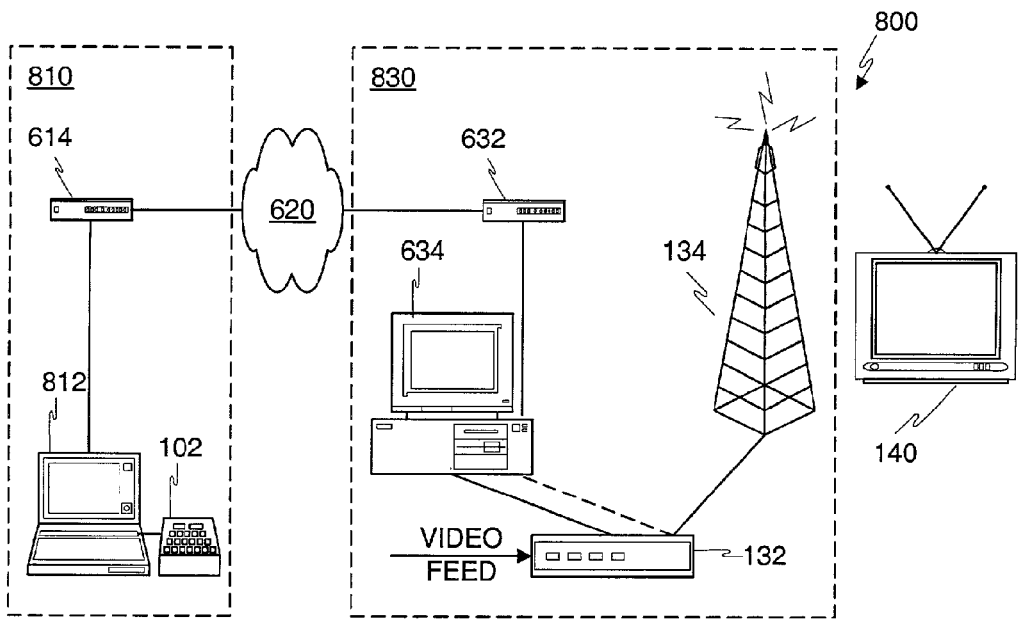
FIG. 8 is a block schematic diagram of another closed captioning system in accordance with the present invention.

An illustrative system 800 for performing closed captioning using a conventional closed captioning encoder and an improved captioning program that incorporates certain functions of the bridge program to change aspects of a caption is shown in FIG. 8. Caption data is transmitted from a computer 812 running the improved captioning program at the captioner's site 810 to the computer 634 running the control program at the broadcast station 830 using any desired transmission agency, illustratively the Internet access devices 614 and 632 and the Internet 620. The control program running on the computer 634 performs a control function based on inputs from the program director at the broadcast station 730. Depending on the embodiment of the control program and the captioning program, the control program may transmit the program directors commands to the captioning program for inclusion as control data in the caption data, with the resulting caption data being passed through the computer 634 to the encoder 132, or the control program may directly execute the program director's commands and modify the control data in the caption data being furnished from the captioning program to the encoder 132, or any variation of the foregoing. The video signal from the encoder 132, which contains the caption data, is combined with audio and is transmitted using a transmission agency such as conventional RF broadcast 134 to a viewer's television set 140, which decodes the transmission and displays the caption on the viewer's screen along with the video work. Optionally, the video signal from the encoder, which contains the caption data, may be furnished to a video frame grabber in the computer 634.

Figure 7:
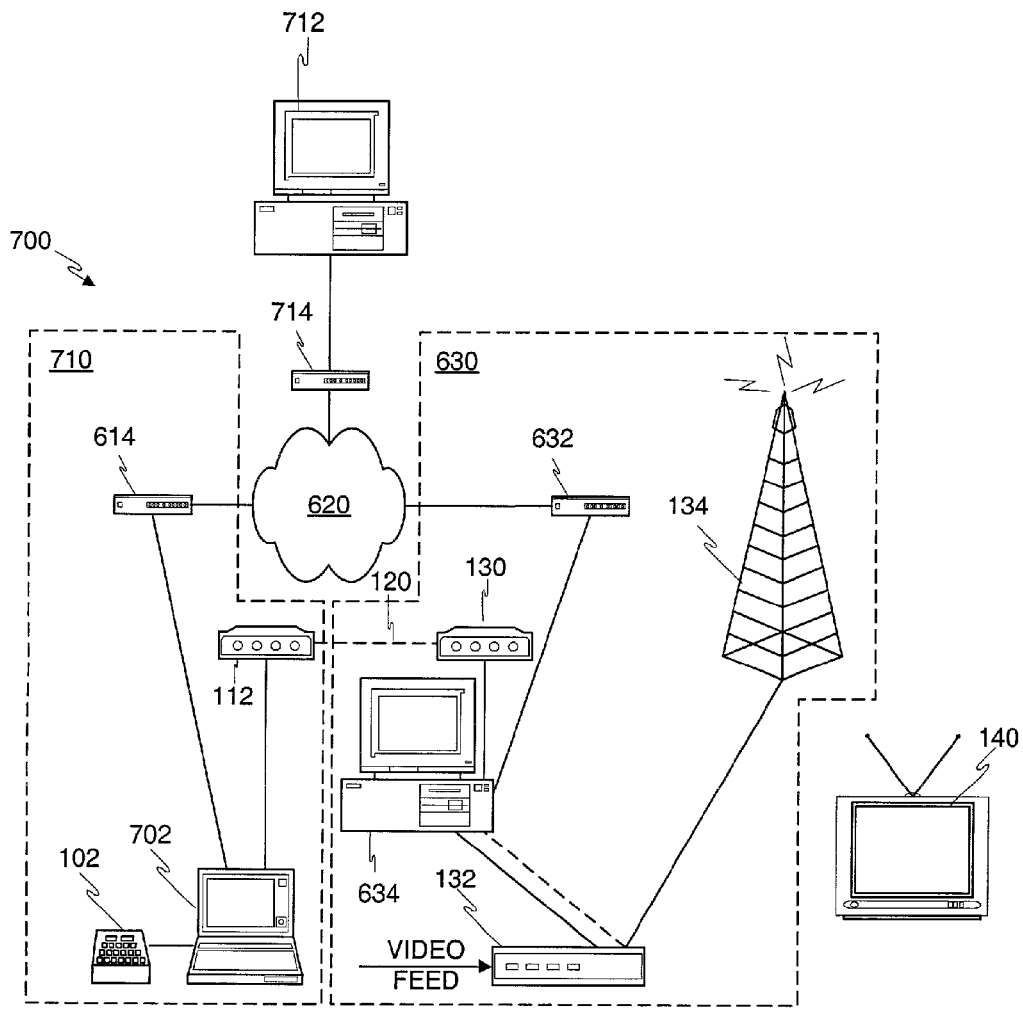
FIG. 7 is a block schematic diagram of another closed captioning system in accordance with the present invention.

While a conventional closed captioning encoder is shown in the systems of FIGS. 6 and 7, the encoder may take a variety of other forms. One such form, for example, is as a plug-in PCI card for a desktop, workstation or server computer, or more generally, any type card that is inserted into an appropriate bus of a computer. Alternatively, the encoder 132 may be furnished with a suitable microprocessor, sufficient memory, suitable input/output ports, and suitable programming for carrying out the functions of the control program.

The control program running on the computer 634 (FIGS. 6 and 7) performs a control function based on inputs from personnel at the broadcast station 630, typically a program director, to achieve results such as shown in FIG. 5. If the program director wishes to change certain aspects of the caption, such as the position of the caption and/or the number of lines in the caption, the program director enters the command to change the aspect in any suitable manner. The various embodiments described herein use a graphical user interface to facilitate the program director's interaction with the system, although other techniques such as keyboard-entered text commands, function key activation, and voice commands may be used in the alternative if desired. Commands entered by the program director are processed in a manner that depends on the specific architecture of the system. In one embodiment which is referred to herein for convenience as the "pass through" approach, the commands to change aspects of the caption are entered by the program director and then are transmitted to the bridge program or a captioning program that includes the essential functionality of the bridge program, for incorporation into the caption data stream. In another embodiment which is referred to for convenience as the "intercept" approach, the commands to change aspects of the caption are entered by the program director and then incorporated into the caption data stream by the control program running on a computer at the broadcast station. More generally, incorporation of the commands to change various aspects of the caption may be divided among or concentrated in one or more software programs running on one or more computers, such as one or more of the following: by a control program running on a computer at the broadcast station, by a bridge program running on a computer at the captioner's site or on a computer on a third party site, by a captioning program running on a computer at the captioner's site, or on any combination of two or more of the foregoing.

Figure 9:
FIG. 9 is a pictorial representation of caption data.

To facilitate a more complete understanding of the "pass through" and "intercept" approaches, refer to FIG. 9 which shows an illustrative segment of caption data suitable for the closed captioning encoder 120. The caption data includes both control codes and caption characters. Caption characters include letters, numbers, symbols and spaces, and may be printing or non-printing. Control codes are used to identify the format, location, attributes, and display of characters, and include preamble address codes, mid-row codes, and miscellaneous control codes. Control codes, caption characters, and the use thereof in closed captioning are more fully described in Title 47 of the Code of Federal Regulations, Part 15, section 119.

FIG. 9 shows a preamble address code 910 followed by caption characters 920. In analyzing the presentation of characters, one can think in terms of a non-visible cursor that marks the screen position at which the next event in a given mode and data channel such as, for example, the display of characters 920, will occur. The preamble address code 910 positions this non-visible cursor.

In the pass through approach, control data are generated by the computer 634 based on inputs from the program director, and are transmitted to another computer (illustratively the computers 612 or 712 at the captioner's site, but may be another computer at the broadcast station or at a third party site (not shown)) for incorporation into caption data. The control data may be instructions to generate control codes, the control codes themselves, or some variation of the foregoing. If the control data are instructions to generate control codes, the application running on the computer at the captioner's site, illustratively either a bridge program or a captioning program improved with the essential functionality of the bridge program, has the capability of processing the control data received from the broadcast station essentially as if they were commands entered by the captioner so that the appropriate control codes are generated. The application running at the captioner's computer detects the next ordinary occurrence of a preamble address code, substitutes the new preamble address code 910, and transmits the caption data 900 to the computer running the control program, for example, the computer 634 in FIGS. 6 and 7. Alternatively, the application running at the captioner's computer may simply insert the new preamble address code 910 into the caption data, although this approach could lead to conflicts and undesired results in some instances. The computer 634 then passes the caption data 900 through preferably unaltered to the encoder 132. The application running at the captioner's site may perform other functions as well in response to receipt of control data from the broadcast station, such as, for example, displaying a notification of the action taken by the program director. Additionally, status and message data may be transmitted from the broadcast station and displayed by the application running at the captioner's site. In an alternative to the pass through arrangement, the caption data 900 may be made to bypass physically the computer running the control program by appropriate intelligent electronic switches external to the computer running the control program (not shown).

In the intercept approach, the computer 634 receives caption data, generates new control data based on inputs from the program director, and incorporates the new control data into the caption data. Incorporation may be done in any suitable manner, but a preferable way is to detect the next ordinary occurrence of a preamble address code in the caption data, substitute the new preamble address code 910, and transmit the modified caption data 900 to the closed captioning encoder 132. Alternatively, the application running on the computer 634 may simply insert the new preamble address code 910 into the caption data, although this approach could lead to conflicts and undesired results in some instances. If desired, a message may also be sent from the computer 634 to the computer at the captioner' site, such as computers 612 or 712, so that the captioner's bridge program or improved captioning application can inform the captioner of the action taken by the program director and update its state if appropriate.

In either the pass through approach or the intercept approach, the captioner may be provided with the ability to override the action taken by the program director.

Figure 10:
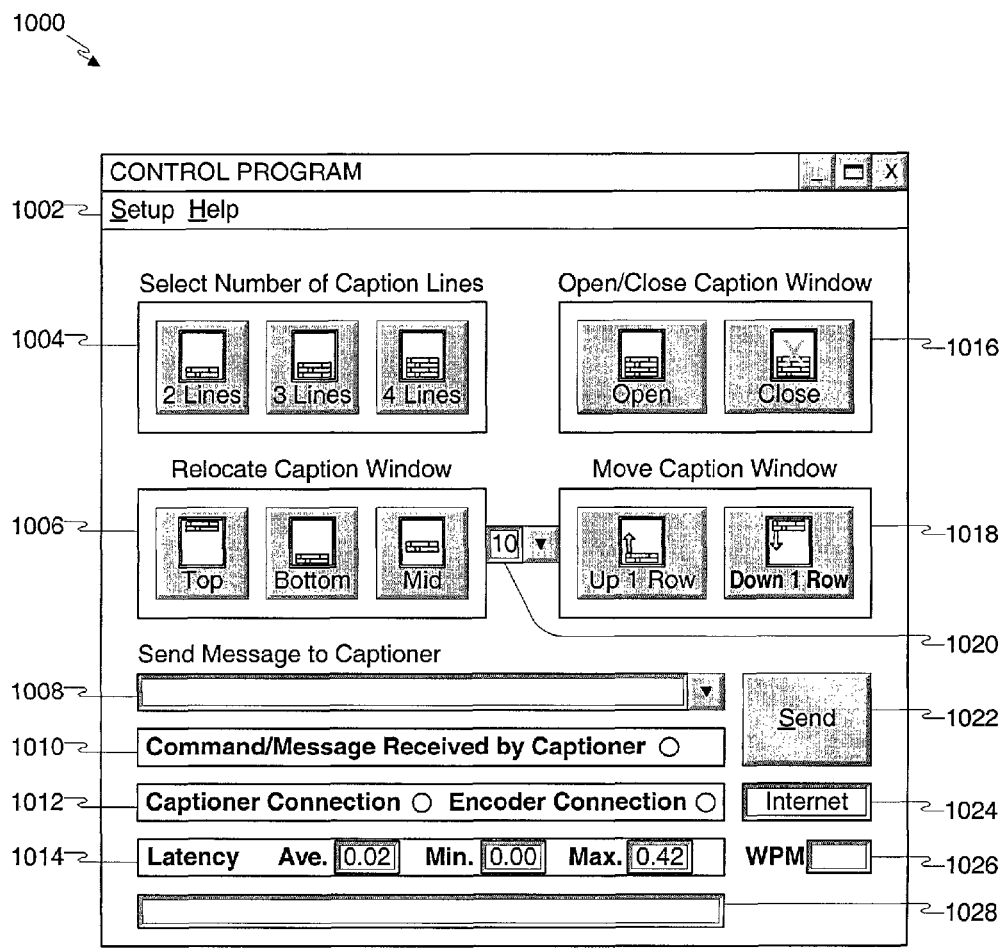
FIG. 10 is a pictorial representation of a user interface that enables a user at the broadcast station site of some embodiments of the systems shown in FIGS. 6 and 7 to adjust certain aspects of a caption, including number of lines and position such as shown in FIG. 5.

Illustrative User Interfaces for Command Incorporation Performed Primarily by the Bridge Program FIG. 10 is a pictorial representation of a user interface 1000 that is displayed to, for instance, a program director at a broadcast station and which is useful for allowing the program director to reposition a caption in the manner shown in FIG. 5 from the broadcast station. The display may be any suitable display device, including such well know devices as video display screens, personal viewing devices, and so forth. The user interface 1000 includes a number of virtual controls including pull down menus, lists, and buttons, as well as various display elements for communicating status and other information to the program director. The controls are operated by positioning a cursor (not shown) with a mouse and then clicking a mouse button, by tapping a touch sensitive screen with or without a stylus, by issuing appropriate voice commands, or by any other convenient user input facility. Corresponding keyboard text entry or key controls, which are other well known types of user input facilities, may be provided if desired.

An area 1002 of the user interface 1000 includes a setup list control and a help list control. An area 1004 of the user interface 1000 includes three buttons for selecting the number of caption lines to be displayed on the video work. Illustratively, one button selects 2 lines, another 3 lines, and another 4 lines. An area 1006 of the user interface 1000 includes three buttons for relocating the caption window on the display of the video work. Illustratively, one button selects the top of the screen, another button selects the bottom of the screen, and another button selects a location generally in the middle of the screen. The middle location is determined by a setting entered by the program director in a list window/button feature 1020 of the user interface 1000. An area 1016 of the user interface 800 includes two buttons for closing and reopening the caption window on the display of the video work. Illustratively, one button opens the caption window if it is closed, and the other button closes the caption window if it is open. Preferably, the caption window remains closed for only a predetermined amount of time following the issuance of the command, unless an open command is issued earlier. An area 1018 of the user interface 1000 includes two buttons for moving incrementally the caption window on the display of the video work. Illustratively, one button moves the caption up one row, and the other button moves the caption down one row. A message window 1008 is provided so that the program director may compose a message and send it to the captioner. The message window 1008 also includes a list control, which is used to display and select from a list of previously composed and, if desired, pre-composed messages. The message composed or selected and displayed in the message window 1008 is sent to the captioner by clicking on the "Send" button 1022. Receipt of the message by the captioner is indicated by system activation of any desired display element, here a virtual light emitting diode ("LED") element placed immediately after the phrase "Command/Message Received by Captioner" in the message area 1010. The type of connection used as the transmission agency between the broadcast station and the captioner's site is shown in the message window 1024, and the status of connections to the captioner's computer such as computers 100, 612 and 712 and to the encoder 132 are indicated by the virtual LED elements immediate following, respectively, the phrases "Captioner Connection" and "Encoder Connection" in the message area 1012. The message window 1014 contains specific information on communications latency, namely the average latency, the minimum latency, and the maximum latency. The number of words per minute is reported in the window 1026. The window 1028 is for miscellaneous information such as depiction of the characters sent to the encoder and so forth.

FIGS. 11-15 are pictorial representations of a user interface that is displayed to a user such as the captioner or a third party service center, for example, and which is useful for allowing the user to monitor various developments and to control certain interactions with the broadcast station. In one embodiment, the user interfaces shown in FIGS. 11-15 are generated by a bridge program running, for example, on the captioner's computer 612 apart from a captioning programming running on the captioner's computer 100, although substantially the same functionality can be built into an improved captioning program running on a single computer such as the computer 712, or the bridge program and the captioning program can run separately on the same computer or on separate but networked computers. For purposes of describing FIGS. 11-15, the bridge program is presumed to perform the incorporation of control data from the client into caption data, although the incorporation may be performed by the control program if desired. The display may be any suitable display device, including such well know devices as video display screens, personal viewing devices, and so forth. The user interfaces of FIGS. 11-15 include a number of controls including pull down menus, lists, and buttons, as well as various display elements for communicating status and other information to the captioner. The controls are operated by positioning a cursor (not shown) with a mouse and then clicking a mouse button, by tapping a touch sensitive screen with or without a stylus, by issuing appropriate voice commands, or by any other convenient user input facility. Corresponding keyboard text entry or key controls, which are other well known types of user input facilities, may be provided if desired. Preferably, the bridge program is protected by a hardware or software security lock requiring the captioner to insert an appropriate hardware or software key to use the bridge program.

The captioner's user interface includes a number of elements that are common to the various particular instances of the user interface in FIGS. 11-15. An area 1110 includes a File list control, an Options list control, and a Help list control. An Internet protocol button 1126 functions when selected to connect the bridge to the control program if it is disconnected, or to disconnect the bridge from the control program if the Internet connection is active. If the bridge and control programs are connected via the Internet, the button 1126 is labeled "IP Disconnect" as shown. If the bridge and control programs are not connected, the button 1126 is labeled "IP Connect." A modem connect button 1128, illustratively labeled "Dial," functions when selected to connect the bridge to the control program via a modem and telephone line such as that shown, for example, in FIG. 6 by the modems 112 and 130 and the dial-up connection 120, if there is no connection, or to disconnect the bridge from the control program if the modem connection is active. If the bridge and control programs are connected via modem, the button 1128 is labeled "Hang UP." If the bridge and control programs are not connected, the button 1126 is labeled "Dial" as shown. Status window 1129 shows the connection status, which is "IP Connected" in FIG. 11. If the connection is by dial up modem, the connection status illustratively would be "Modem Connected." Status window 1138 shows a list of all captioners authenticated by the control program for the particular customer to which the captioner is connected. One captioner is the active captioner, and the other captioners are on standby. A "Seize" button 1136 functions when selected to allow the captioner to choose to become the active captioner. A list of authenticated captioners in combination with a seize button is particularly useful for facilitating seamless and rapid handoffs from one captioner to another. Handoffs are normally quite awkward when direct modem-to-modem connection is used, since the currently connected captioner must terminate the connection to permit the replacement captioner to dial in and resume captioning. Typically, such handoffs occur during commercial breaks, since they require about a minute and a half to complete. In contrast, having one or more authenticated captioners on standby allows an authenticated captioner to initiate and complete a handoff seamlessly and nearly instantaneously simply by selecting the "Seize" control 1136 and beginning to transcribe where the previously active captioner left off. The handoff itself is implemented by the control program. Alternatively, the program director may be provided with suitable controls and lists for selecting which captioner to make the active captioner. A "Communications" area 1120 contains an array of virtual LEDs to indicate active (Act), connect (Con), transmit (Tx) and receive (Rx) status for a Caption Input parameter such as the captioner's Internet Service Provider ("ISP") address, a Client Data Output parameter such as the caption and message data on the Internet port, and a Client Media parameter such as the video and audio on the Internet port. A "Control Module IO" or control module input/output area 1122 includes three sub-areas 1124, 1144 and 1142. Sub-area 1124 is a display window. If the control software running on the broadcast station computer includes an ability to "grab" a screen frame periodically, say, for example, every ten seconds or so, the grabbed screen frames may be transmitted to the captioner's computer and displayed in the picture window 1124, thereby allowing the captioner to monitor the broadcast and the captions appearing therein. Sub-area 1144 contains three information windows for informing the captioner of any position overrides made by the program director to, respectively, the number of lines in the caption and the number of rows the caption has been moved up or down, and also whether the caption window has been suspended. Since the only change made by the program director in the example is to move the caption two rows up, only this change is reported in the client position override sub-area 1140 and the caption is indicated by "Cap Passing" as passing. Sub-area 1144 also contains a button "Reset OVR" for resetting the overrides made by the program director. Sub-area 1142 is a message window for displaying messages entered into the message window 1008 of the user interface 1000 by the program director and transmitted from the computer at the broadcast station running the control program to the computer at the captioner's site running the bridge program. Illustratively, the message "Weather alert is 30 seconds long" is displayed in the message window of the sub-area 1142. A "Clear" button 1140 located in proximity to the message window 1142 functions to clear the message window 1142 when desired by the captioner. The user interface also contains a number of tabs such as 1201 (FIG. 12) and 1102, 1103, 1104 and 1105 (FIG. 11) which are useful for selecting one of the display areas of "Client Info," "Event," "Connection," "Capture," and "Diagnostics" as the active display area.

Figure 11:
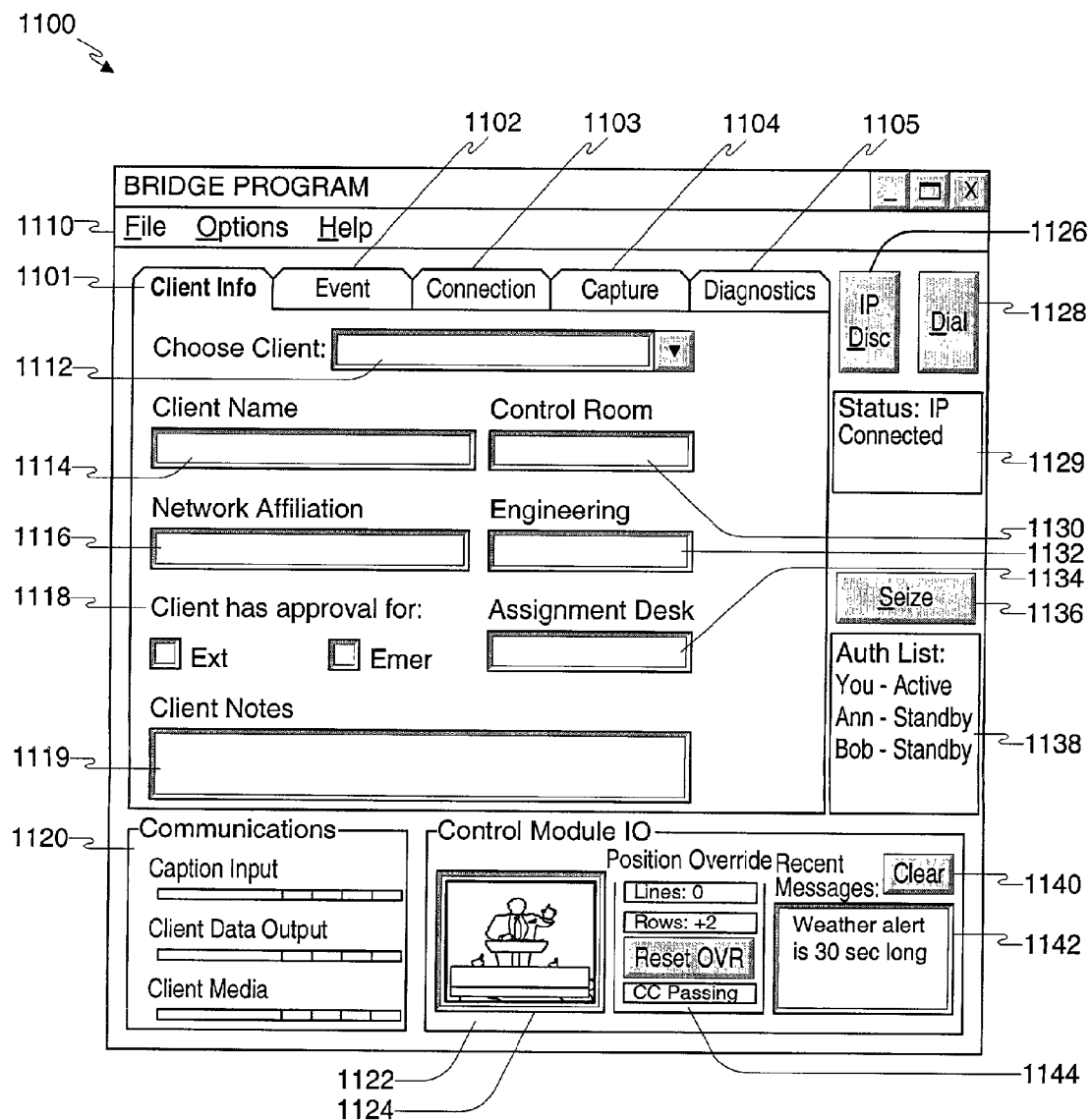
FIG. 11 is a pictorial representation of a user interface that enables a captioner at the captioner's site to select a client for whom real time captioning is to be done and to receive and review certain useful information about the client, for some embodiments of the systems shown in FIGS. 6 and 7.

FIG. 11 shows a particular instance of the user interface that includes a tabbed active display area 1101 identified by the heading "Client Info." The display area 1101 enables a captioner at the captioner's site to receive and review certain useful information about the various clients of the captioner, as well as to select a particular client for whom real time captioning is to be done, for some embodiments of the systems shown in FIGS. 6 and 7. If not already displayed by default, the tabbed display area 1101 identified by the heading "Client Info" is made the active display area when the captioner clicks on the "Client Info" tab 1201 (see FIG. 12). The display area 1101 includes a choose client window 1112. The captioner preferably uses a list control included with the choose client window 1112 to display and select from a list of client names. The bridge program then accesses various useful information about the selected client, preferably from a Web page accessed via an Internet connection. Examples of useful client information includes confirmation of the client's name, the client's network affiliation, the telephone numbers for the selected client's control room, engineering department, and assignment desk, and whether the client has approval for extensions and/or emergencies, which are display in the respective windows 1114, 1116, 1130, 1132, 1134 and 1118. The captioner may use this information to confirm that she is sending caption data to the right client and to contact the appropriate client employee as needed. Additional information about the client that might be of interest to the captioner is displayed in the "Client Notes" window 1119.

The captioner connects to a particular client over the Internet by causing the client's name to be displayed in the window 1112 and pressing the IP connection button 1126. When a connection between the bridge program and the control program is achieved, the status window 1129 displays the message "IP Connected." The computer 634 at the client's broadcast station performs an authentication operation with the bridge program to ensure that the bridge program is an authorized copy. While any desired authentication protocol may be used, an illustrative protocol involves having the bridge program at the captioner's site return to the control program at the broadcast station a value calculated from the mathematical manipulation of a randomly generated number sent by the control program, and confirming in the control program that the returned value is correct. Once the bridge program is authenticated by the control program, the control program places the captioner on standby. In the event that no other captioner is active, the captioner is automatically made the active captioner. The authenticated captioner list window 1138 in FIG. 11 shows the captioner as being active, and Ann and Bob as being on standby.

Figure 12:
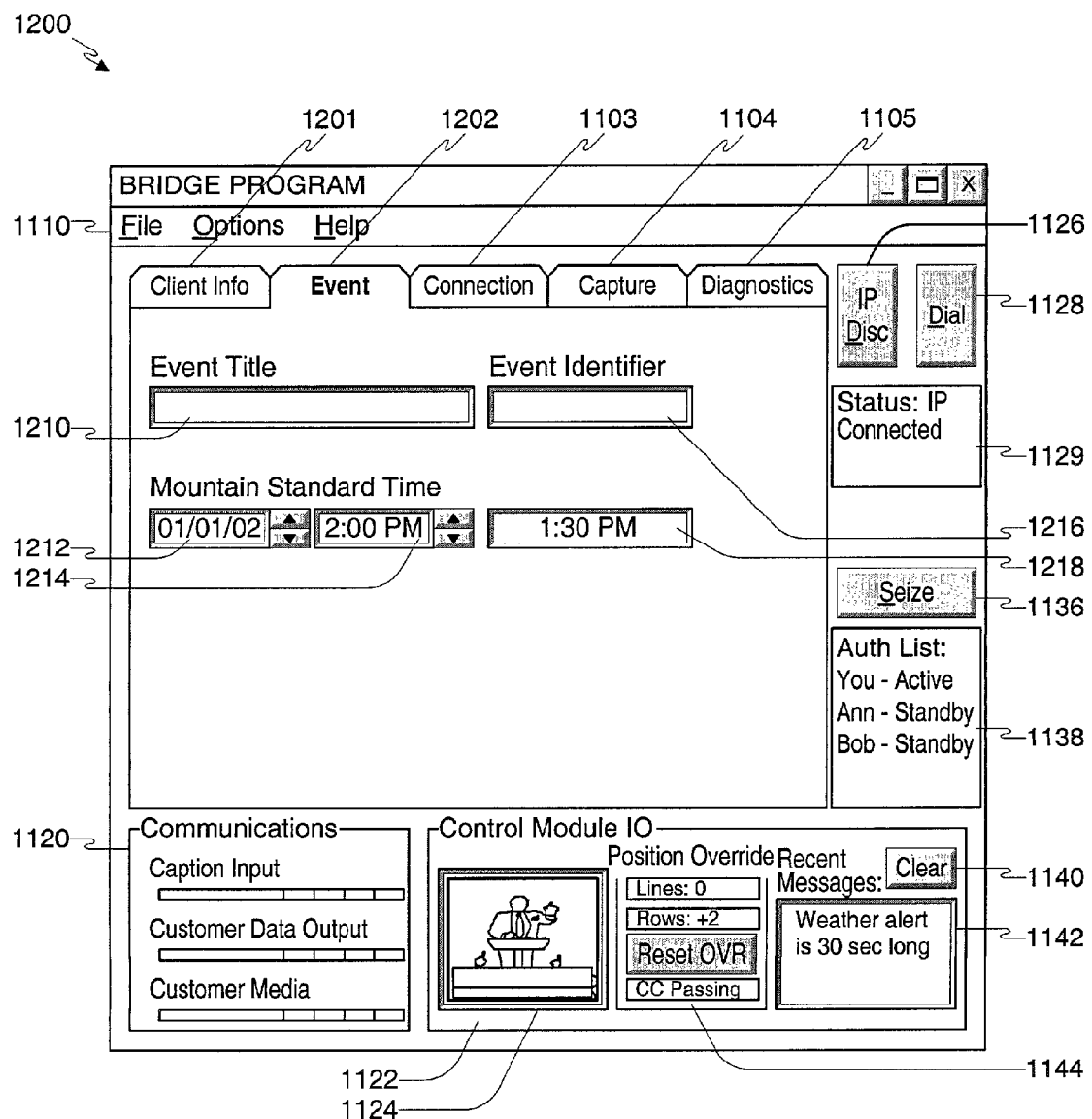
FIG. 12 is a pictorial representation of a user interface that enables a captioner at the captioner's site to enter information regarding events, for some embodiments of the systems shown in FIGS. 6 and 7.

FIG. 12 shows a particular instance of the user interface that includes a tabbed display area 1202 identified by the heading "Event." The display area 1202 enables a captioner at the captioner's site to enter certain information about the event that the client might find useful for its specific needs, for some embodiments of the systems shown in FIGS. 6 and 7. Illustrative information includes the event title in the composition window 1210 (for instance, an annual stockholders meeting), an event identifier in the composition window 1216 (for instance, the ticker symbol for the company's stock), and the date and time of the event in the date and time windows 1212 and 1214. The current time is reported in display window 1218.

Figure 1:
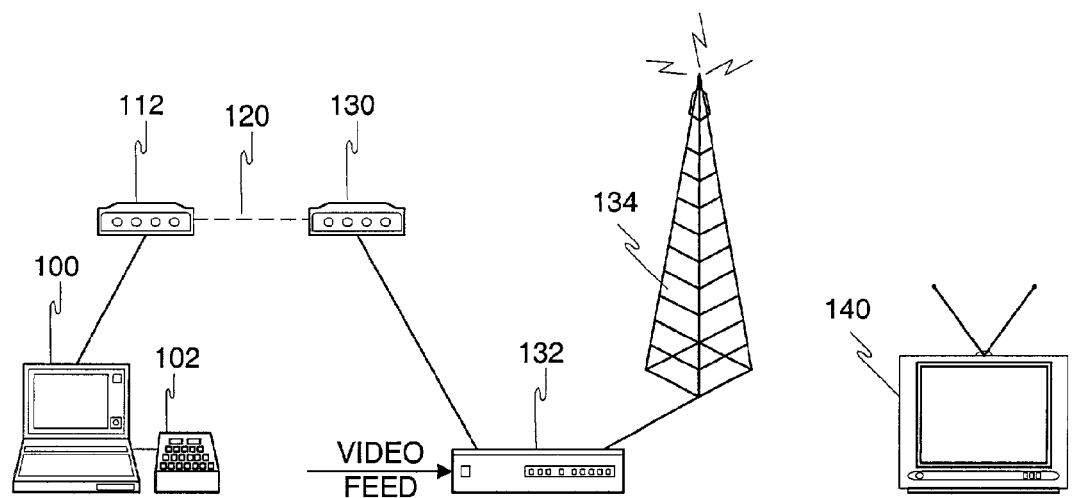
FIG. 1 is a schematic diagram of a closed captioning system of the prior art.
Figure 2:
FIG. 2 is a pictorial representation of a video screen containing a banner message, as in the prior art.
Figure 3:
FIG. 3 is a pictorial representation of a video screen containing a closed caption, as in the prior art.
Figure 4:
FIG. 4 is a pictorial representation of a video screen containing a banner message that is obscured by a closed caption, as in the prior art.
Figure 13:
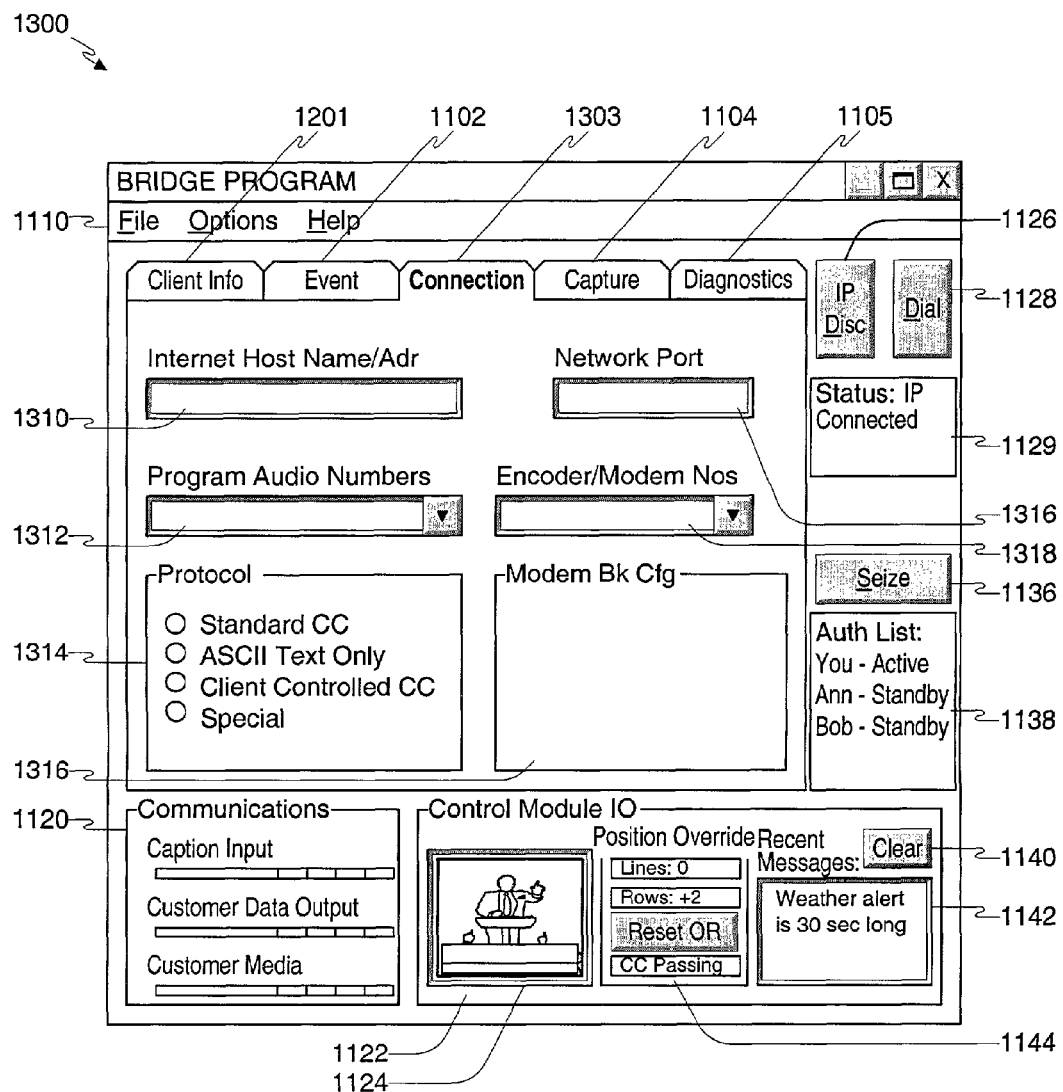
FIG. 13 is a pictorial representation of a user interface that enables a captioner at the captioner's site to review certain useful information and control some options regarding connections for real time closed captioning, for some embodiments of the systems shown in FIGS. 6 and 7.

FIG. 13 shows a particular instance of the user interface that includes a tabbed active display area 1303 identified by the heading "Connection." The display area 1303 enables a captioner at the captioner's site to review certain useful information and control some options regarding connections for real time closed captioning, for some embodiments of the systems shown in FIGS. 6 and 7. Specifically, the captioner is able to determine the protocol for use with the client by selecting the appropriate radio button in area 1314 of the tabbed display area 1303. Illustratively, four radio buttons are shown for selecting from, respectively, a standard closed captioning protocol, an ASCII text only protocol, a supplemental client controlled closed captioning protocol, and a special customer-specific protocol. The standard closed captioning protocol is that which is typically used in the FIG. 1 system and is compliant with 47 C.F.R. §15.119. The ASCII text only protocol is similar to the standard closed captioning protocol but has all control codes striped out. The ASCII text only protocol is useful for many purposes, including overlaying on digitized video that is then streamed or otherwise transmitted to a viewer's computer or set top box or any other suitable device (not shown) via the Internet. The supplemental client controlled closed captioning protocol is compliant with 47 C.F.R. §15.119 and also enables the pass through approach or the intercept approach to be carried out between the control program and the bridge program. The special protocol represents a customer-specific protocol, where certain unique requirements of a particular customer such as the use of start-up protocols are accommodated. The event information described with reference to FIG. 12 is an example of where a special protocol would be used. The special protocol may or may not be compliant with 47 C.F.R. §15.119 depending on a particular customer's specifications. Of course, any number of other protocols, both existing and to be developed, also may be used if desired. Moreover, some types of special protocol may also be overlaid on digitized video that is then streamed or otherwise transmitted to a viewer's computer or set top box or any other suitable device (not shown) via the Internet. The display area 1303 also includes four information windows 1310, 1316, 1312 and 1318, which respective identify the host name and address, and where applicable, the network port, the program audio numbers, and the encoder/modem numbers. The display area 1303 also includes a modem backup configuration area 1316, which is useful to control a modem connection when an Internet connection is unavailable. The area 1316 contains an array of virtual LEDs to indicate active (Act), connect (Con), transmit (Tx) and receive (Rx) status, and a variety of settable parameters such as the dial prefix, the dial number, the modem serial port, the number of data bits, the parity, and the number of stop bits.

Figure 14:
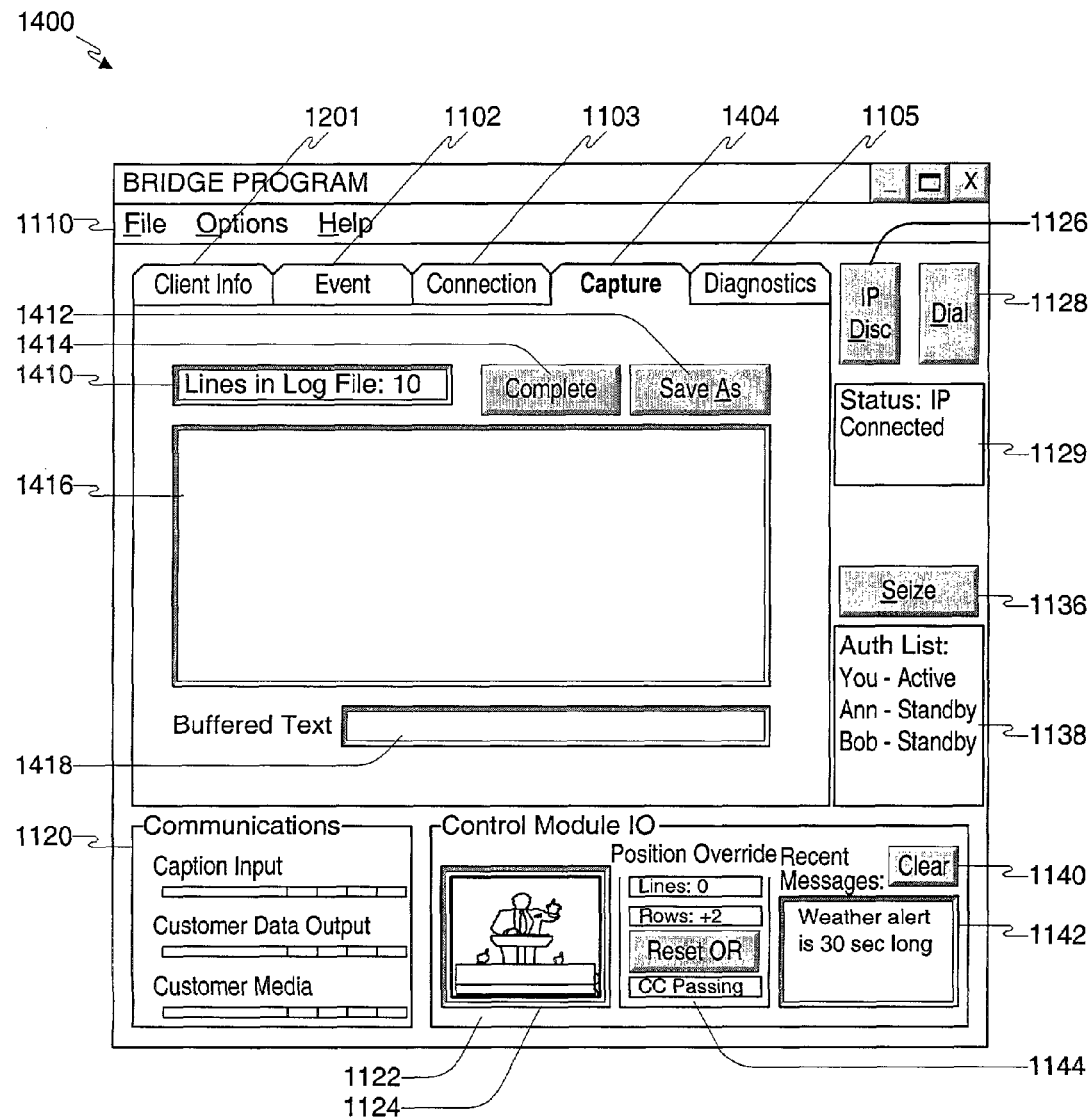
FIG. 14 is a pictorial representation of a user interface that enables a captioner at the captioner's site to review certain useful information and control some options regarding information captured during real time closed captioning, for some embodiments of the systems shown in FIGS. 6 and 7.

FIG. 14 shows a particular instance of the user interface that includes a tabbed active display area 1404 identified by the heading "Capture." The display area 1404 enables a captioner at the captioner's site to review certain useful information and control some options regarding information captured during real time closed captioning, for some embodiments of the systems shown in FIGS. 6 and 7. Specifically, the captioner is able to learn the number of lines in the log file, which is reported in the information window 1410, is able to indicate a complete event by selecting the "Complete" button 1414, and is able to save the current log file by selecting the "Save As" button 1412. When the button 1412 is selected, a dialog box appears so that the file may be selected or created, in a manner well known in the art. The log file itself is displayed in the window 1416. Buffered text that has not yet been sent to the control program is displayed in the window 1418.

Figure 15:
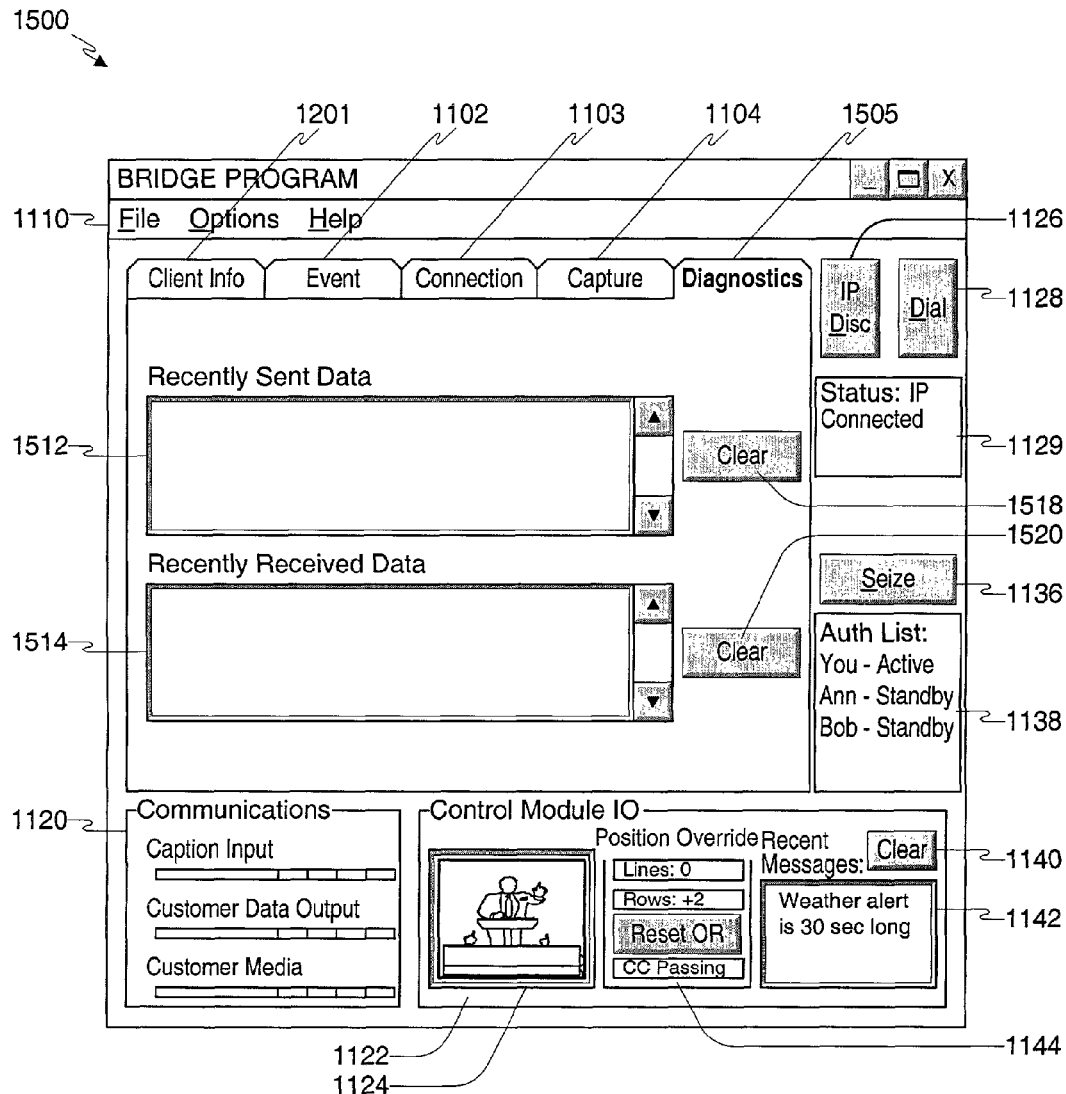
FIG. 15 is a pictorial representation of a user interface that enables a captioner at the captioner's site to review certain useful information and control some options pertaining to diagnostics, for some embodiments of the systems shown in FIGS. 6 and 7.

FIG. 15 shows a particular instance of the user interface that includes a tabbed active display area 1505 identified by the heading "Diagnostics." The display area 1505 enables a captioner at the captioner's site to review certain useful information and control some options pertaining to diagnostics, for some embodiments of the systems shown in FIGS. 6 and 7. All recently sent data is displayed in window 1512 while all recently received data is displayed in window 1514. The displayed information is of value to support personnel when a problem develops in using the bridge program. The information windows 1512 and 1514 may be cleared by selecting the respective "Clear" buttons 1518 and 1520.

Illustrative System for Command Incorporation Performed Primarily by the Bridge Program While some of the user interface functions are naturally best performed at the broadcast station and while some of the user interface functions are naturally best performed at the captioner's site, many of the functions not specific to one or the other of the user interfaces may be performed at various places in the system. For example, incorporation of the program director's override control data into the caption data may be performed either at the broadcast station or at the captioner's site, and may even be performed on a server located on the Internet remote from the broadcast station and the captioner's site.

The general system architecture of FIG. 6 supports the process example shown in FIG. 16 in which the control program runs on the computer 634 at the broadcast station and provides a highly effective interface with the program director but little direct manipulation of the caption data, while the bridge program runs on the computer 612 at the captioner's site and provides both a highly effective interface with the captioner and a high degree of manipulation of the caption data. A conventional captioning program such as the TurboCAT program runs on the computer 100.

In the broadcast station 630, the computer 634, illustratively an IBM compatible type computer, is cabled to the encoder 132 from any suitable port such as, for example, the COM2 port. If a dial-up modem connection is used in the transmission agency 120, the computer 634 is cabled to modem 130 from any suitable port such as, for example, the COM1 port. If an Internet 620 is used, the connection may be made in any suitable manner such as, for example, through an Ethernet port and a cable or DSL modem. Generally speaking, any desired type of port may be used in the broadcast station computer 634 for communications, including dedicated or shared ports using any suitable protocols such as, for example, serial, parallel, PCMCIA, USB, Ethernet, and so forth. Generally speaking, communications through a port can be over a single connection or multiple simultaneous connections using, for example, the Winsock API.

In the captioner's site 610, the computer 612, illustratively an IBM compatible type computer, is cabled to the computer 100, illustratively an IBM compatible type computer, via any suitable type of port such as, for example, the COM2 port. If a dial-up modem connection is used in the transmission agency 120, the computer 100 is cabled to modem 112 from any suitable port such as, for example, the COM1 port. If the Internet 620 is used, the connection may be made from the computer 612 in any suitable manner such as, for example, through an Ethernet port and a cable or DSL modem. Generally speaking, any desired type of port may be used in the broadcast station computer 634 for communications, including dedicated or shared ports using any suitable protocols such as, for example, serial, parallel, PCMCIA, USB, Ethernet, and so forth.

Figure 16A:
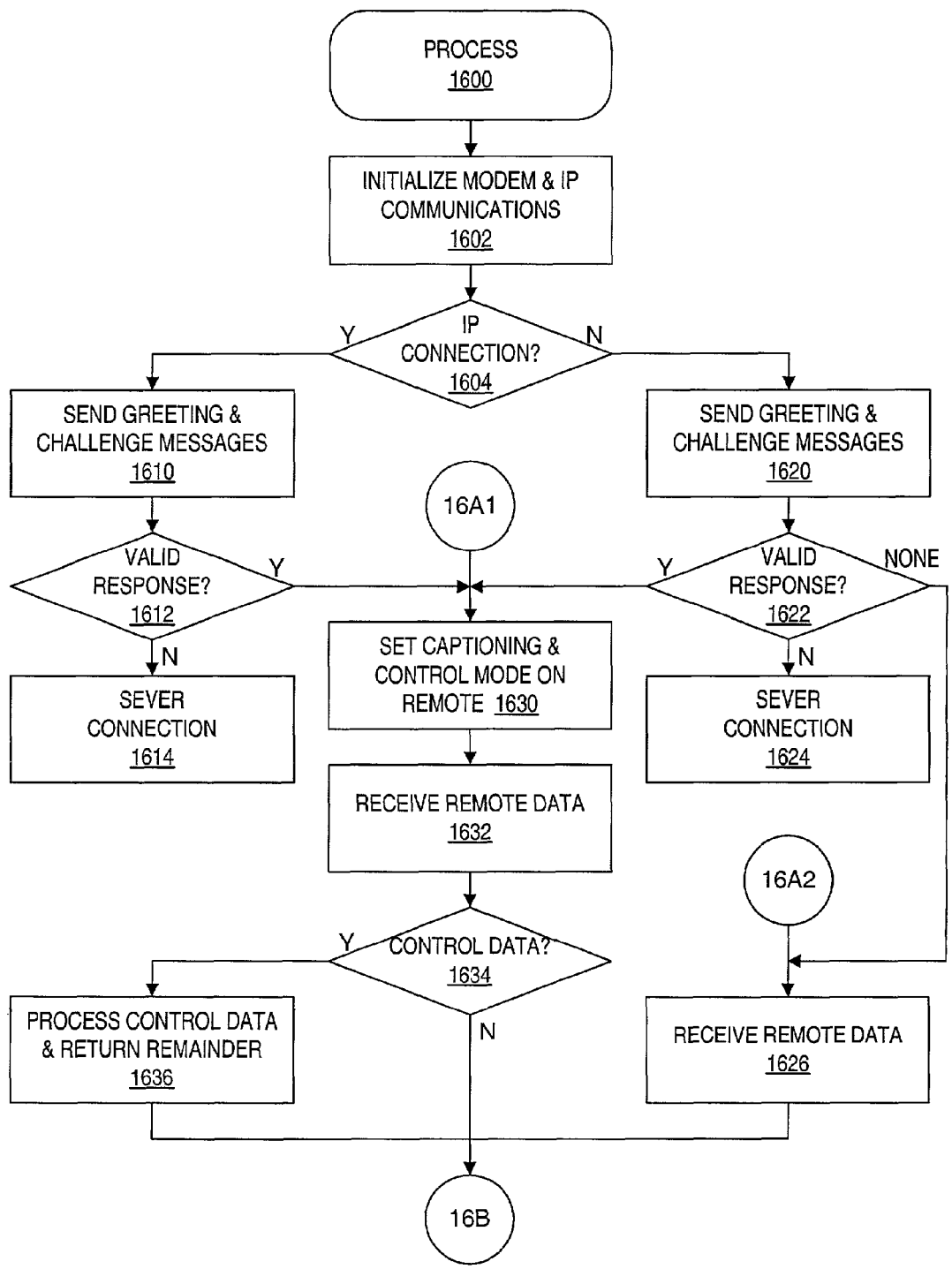
FIGS. 16A and 16B show a flowchart of a process in the control program for enabling a user at the broadcast station site of some embodiments of the systems shown in FIGS. 6-8 to change certain aspects of the caption so that the caption and a banner may be displayed together without interference, such as shown in FIG. 5.
Figure 16B:
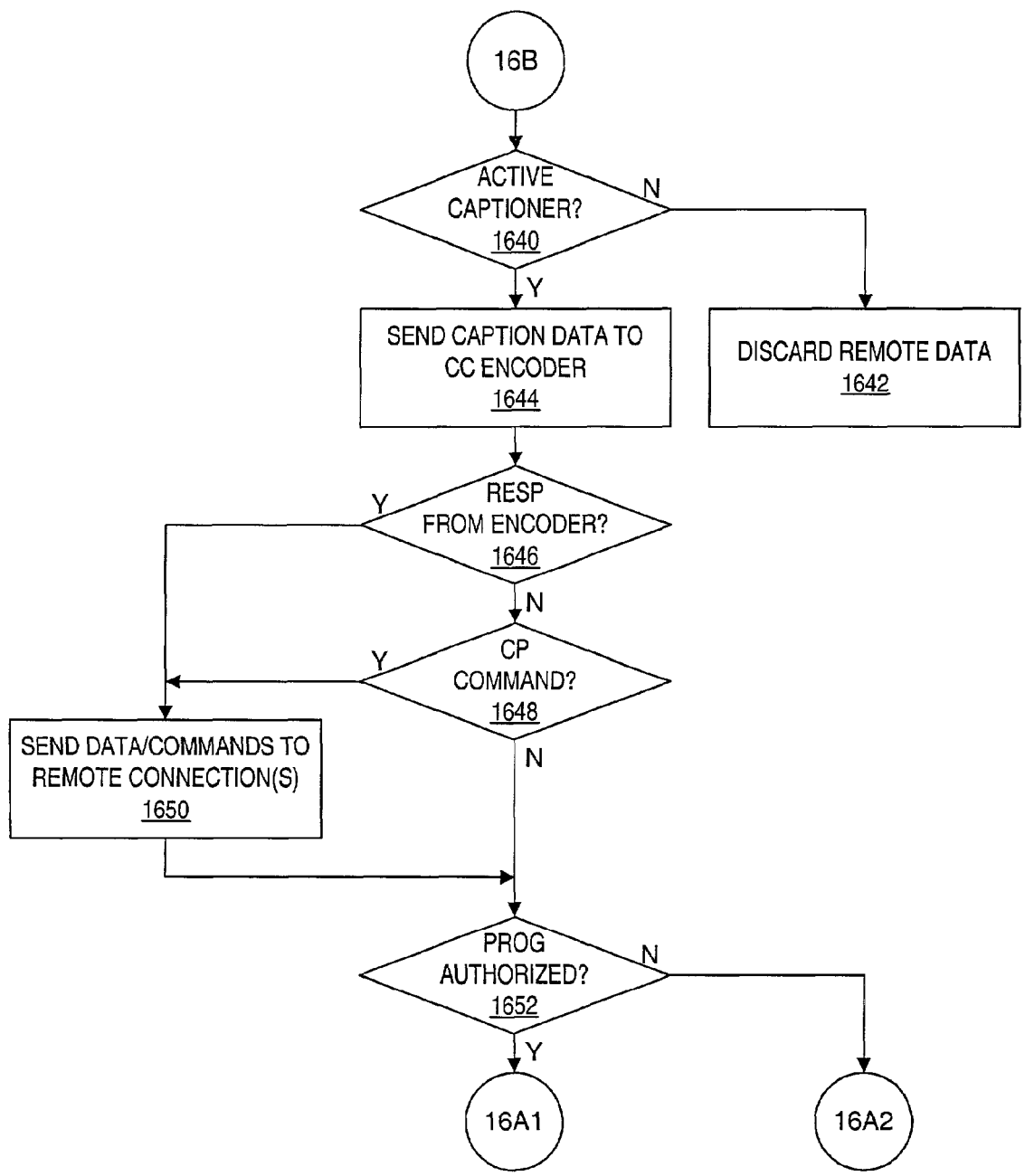
Figure 17:
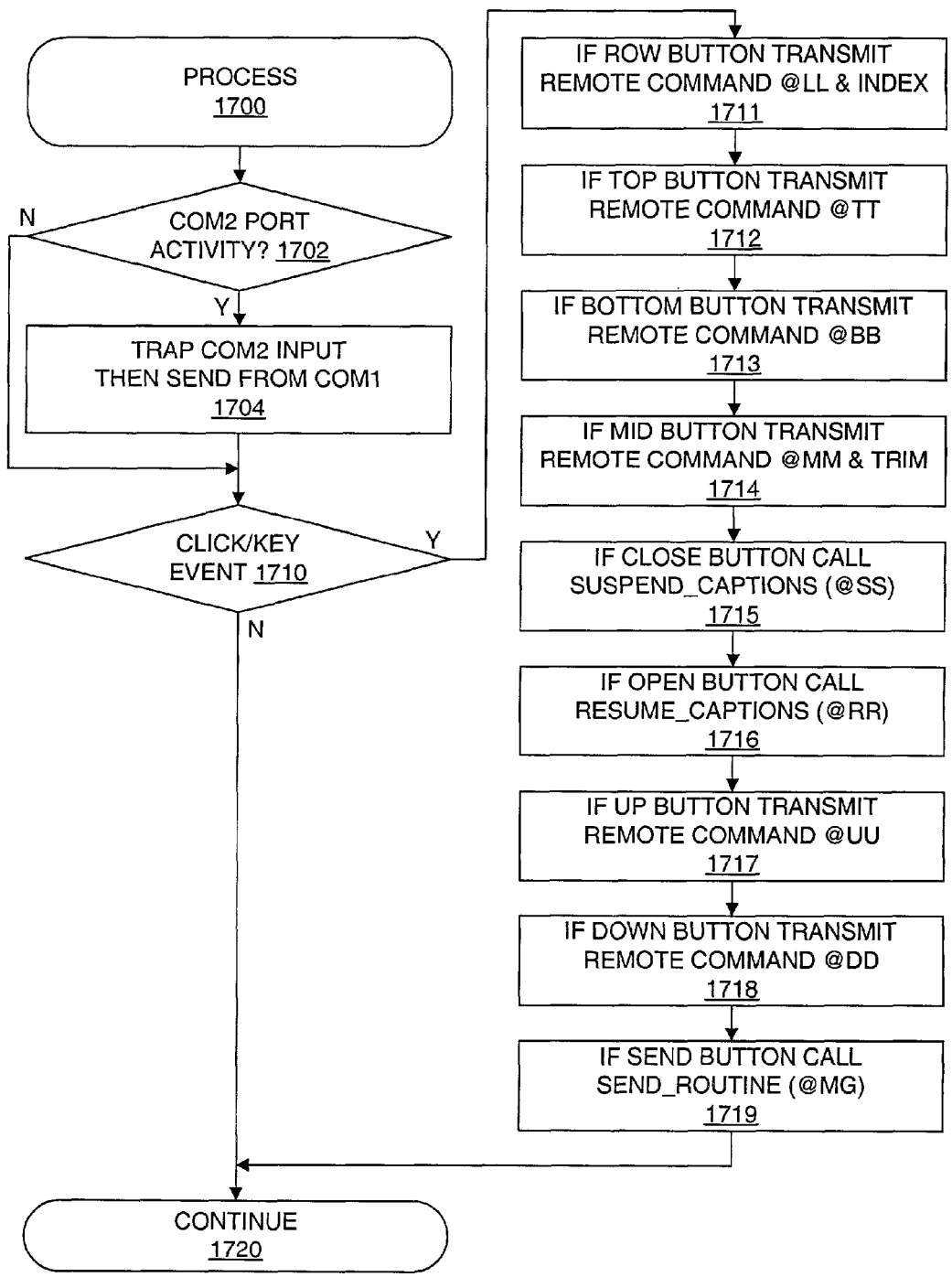
FIG. 17 shows a flowchart that details a portion of the process of FIGS. 16A and 16B.
Figure 18A:
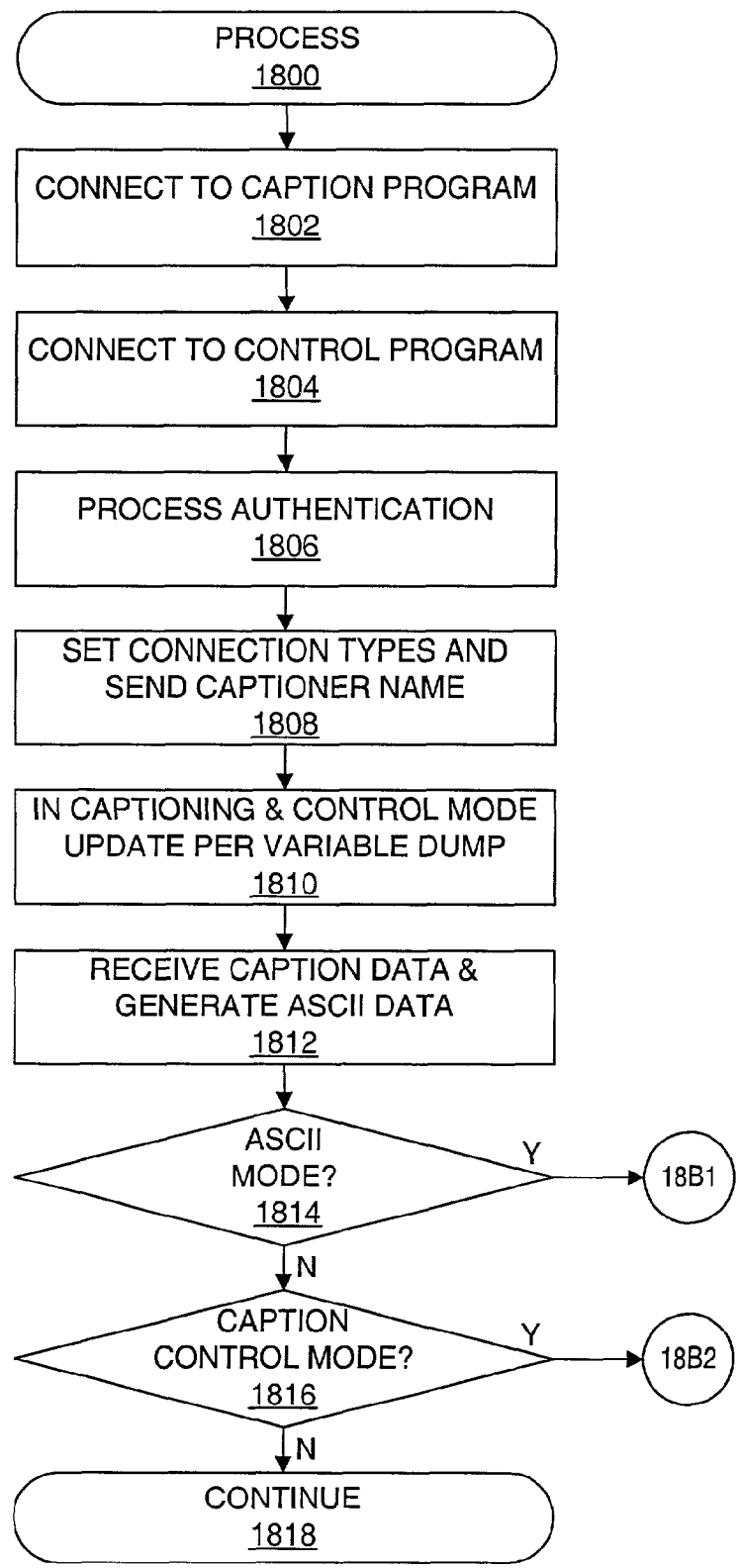
FIGS. 18A and 18B show a flowchart of a process in the bridge program for generating caption data that incorporates control data from the control program so that the caption and a banner may be displayed together without interference, such as shown in FIG. 5.
Figure 18B:
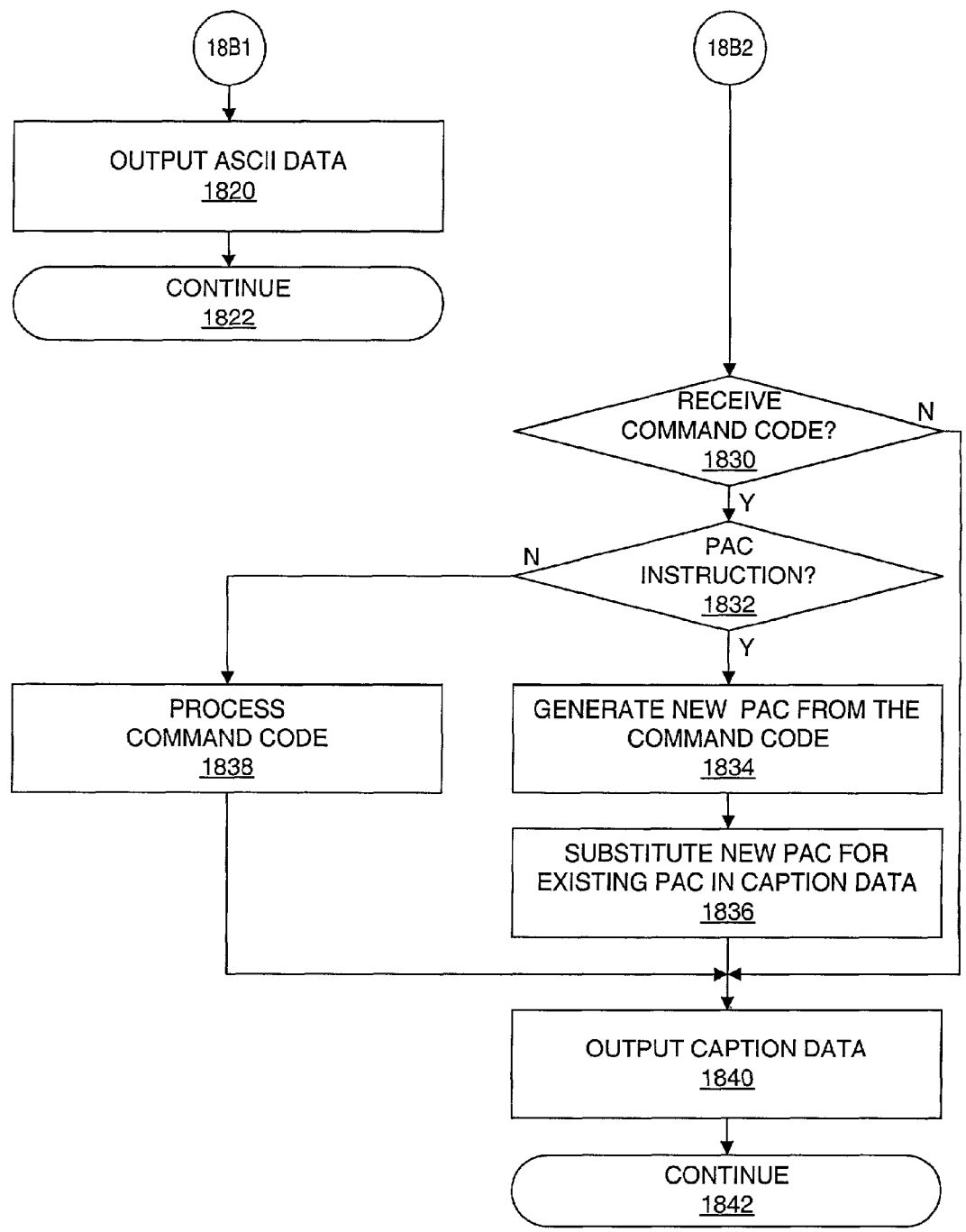

FIGS. 16A and 16B show a flowchart of a process 1600 in the control program for enabling a user at the broadcast station site of some embodiments of the systems shown in FIGS. 6-8 to change certain aspects of the caption so that the caption and a banner may be displayed together without interference, such as shown in FIG. 5. FIG. 17 shows a flowchart of a process 1700, which is a more detailed view of part of the process 1600. FIG. 18 is a flowchart of a process 1800 in the bridge program for generating caption data that incorporates control data from the control program ("CP control data") so that the caption and a banner may be displayed together without interference, such as shown in FIG. 5. It will be appreciated that while the processes 1600, 1700 and 1800 are shown in flow chart form for clarity, the process may be implemented using any desired programming technique, including script-based programming techniques and object-oriented programming techniques. Many routine operations well known in the art are omitted from FIGS. 16-18 for clarity. For example, the processes 1600 and 1800 may be provided with any suitable error detection capability (not shown) or no error detection capability, as desired. Also, low level routines of a type well known in the art (not shown) are used with the various control of the user interfaces shown in FIGS. 10-15, such as routines that sense click events over button and control locations and that generate remote caption commands and handle more complicated operations. Also, certain message areas and message windows such as the message areas 1010 and 1012 and the message windows 1008, 1014, 1024 and 1026 in FIG. 10 and various message areas and windows in FIGS. 11-15 are active and event driven in a manner well known in the art. For example, when messages are sent and received, the event triggers notification of the user and the details of the communications are transparent to the user.

Refer now to the process 1600 shown in FIGS. 16A and 16B. It will be appreciated that the data sets and forms used by the control program, which includes the process 1600, may be stored in any desired manner. For example, a dedicated data base containing the various data sets and forms may be provided, or the data sets may be stored in the computer's registration database while the forms may be stored in the executable files. Regardless of how stored, the data sets and forms illustratively concerning various interval timer default values, the protocols for the communications ports, the various legal notices such as license restrictions and intellectual property protection, various global constants, various global routines, a scratch pad, any desired help text, messages previously typed by the program director to the captioner as well as any pre-loaded standard messages, modem setup data, IP address data for Internet access, various user option settings such as the location of the middle row, the type of modem in use, and so forth, identification of the broadcast station, and various screens such as the introductory screen and the shutdown screen. These and other data storage techniques and techniques for accessing the data are well known in the art.

The process 1600 begins with initialization of the modem and internet protocol communications (block 1602) for connection to one or more remote computers. The remote computer may be running the bridge program, an improved captioning program that incorporates functions of the bridge program to change aspects of a caption, or any other type of captioning program referred to herein for convenience as a "generic" caption application. When a remote computer contacts the control program, the type of connection, either internet protocol or modem, is detected (block 1604). If an internet protocol connection is made (block 1604—YES), greeting and challenge messages are sent by the control program to the remote computer (block 1610). This is an authentication operation. If the response is not valid or if timeout occurs (block 1612—NO), the connection is severed (block 1614) because the remote computer is not running an authorized copy of the bridge program or an improved captioning program. If the response is valid (block 1612—YES), the remote computer is authenticated. Alternatively, if a modem connection is made, greeting and challenge messages are sent (block 1620). If a response is received but is not valid (block 1622—NO), the connection is severed (block 1624) because although the remote computer is running the bridge program or an improved captioning program, the copy is not authorized. If the response is valid (block 1622—YES), the remote computer is authenticated. Upon authentication, the control program sets the remote to a caption/control mode (block 1630) (or other modes (not shown) as desired) and remote data is received (block 1632).

When remote data is received after authentication (block 1632), a determination is made as to whether the remote data includes control data (block 1634) from the bridge program or an improved captioning program (hereinafter "B/C control data"). "Control data" is a broad term encompassing any type of data used for control purposes. B/C control data illustratively includes the command code @#ID to identify the bridge program or improved captioning program to the control program; the command code @#CT to establish the type of connection channels, for example, captioning & control, audio, and video, that are supported; the command code @#VR to request the control program to send a variable dump for initializing or updating the state of the bridge program or improved captioning program; the command code @# to acknowledge receipt of a message from the control program; and the command code @~@~ to disconnect. If B/C control data is contained in the remote data (block 1634—YES), the control program strips the B/C control data from the remote data, acts on the B/C control data, and returns the remainder (block 1636), which is then further processed as shown in FIG. 16B. If no B/C control data is contained in the remote data (block 1634—NO), processing continues as shown in FIG. 16B.

Refer back to block 1622. If no response is received to the challenge message, then the modem connection probably is to a "generic" captioning application. In this event, the remote data is not expected to contain valid B/C control data, so the remote data is received without checking for B/C control data (block 1626) and processing continues as shown in FIG. 16B.

Refer now to FIG. 16B. A determination is made as to whether the remote computer is the active captioner (block 1640). If not (block 1640—NO), the remote data is discarded. If the remote computer is the active captioner (block 1640—YES), the remote data, which is in the form of caption data due to the removal of any B/C control data, is sent to the closed caption encoder (block 1644). Any response from the closed caption encoder (block 1646—YES) is sent to the remote connection or connections as appropriate (block 1650). Any commands from the control program (block 1648—YES) is sent to the remote connection or connections as appropriate (block 1650). If the remote computer is authorized (block 1652—YES), processing proceeds with the receipt of additional remote data that may contain B/C control data (FIG. 16A, block 1632). If the remote computer is not authorized (block 1652—NO), processing proceeds with the receipt of additional remote data that is not expected to contain any B/C control data (FIG. 16A, block 1626).

FIG. 17 shows in more detail the part of the process 1600 for handling a response from the closed caption encoder (blocks 1746 and 1750) and commands from the control program (blocks 1748 and 1750). For purposes of FIG. 17, use the example set forth herein, namely that the Ethernet port of the broadcast station computer 634 is cabled to the Internet access device 632 for communication with the bridge program running on the computer 612, and COM2 is cabled to the encoder 132 for communication with the encoder 132. Preferably, only a single bi-directional connection is used for both caption data (caption characters and control data) from the bridge program running on the computer 612 at the captioner's site as well as command and message data from the control program running on the computer 634 at the broadcast station. Advantageously, this permits full compatibility with modem transmissions. However, multiple simultaneous connections or separate dedicated connections may be used in a manner well known in the art, if desired and if supported by the hardware.

Activity on the communications ports of the broadcast station computer 634 is monitored (block 1702) and certain actions taken as appropriate. For example, if an input from the encoder 132 such as an asterisk character indicating receipt of data is detected on COM2 (block 1702—YES), the input is trapped by the control program (broadcast station computer 634) and then transmitted to the bridge program (captioner computer 612) via COM1 (block 1704). If desired, the control program (broadcast station computer 634) may also automatically detect and display a message from the bridge program (captioner computer 612) (not shown).

Mouse clicks or key touch events also are detected (block 1710—YES) and calls are made to corresponding functions as appropriate. For example, each virtual button click calls a function that either generates a command code or calls an appropriate subroutine. Various command data are generated as follows. Clicking one of the three buttons in the area 1004 or pressing one of the keys F2, F3 or F4 calls a function cmd_rows_Click, which sets up how many rows to display and generates and transmits the command code @LL and a parameter for the number of caption lines (block 1711). Clicking the "Top" button in the area 1006 or pressing the HOME key calls a function cmdTop_Click which generates and transmits the command code @TT (block 1712). Clicking the "Bottom" button in the area 1006 or pressing the END key calls a function cmdBottom_Click which generates and transmits the command code @BB (block 1713). Clicking the "Mid" button in the area 1006 or pressing the F5 key calls a function cmdMidRow_Click, which detects the midrow setting and generates and transmits the command code @MM and a Trim midrow setting (block 1714). Clicking the "Close" button in the area 1016 or pressing the DEL key calls a function cmdClose_Click, which in turn calls a SuspendCaptions subroutine (block 1715). The SuspendCaptions subroutine transmits the command code @SS. Clicking the "Open" button in the area 816 or pressing the INS key calls a function cmdOpen_Click, which in turn calls a ResumeCaptions subroutine (block 1716). The SuspendCaptions subroutine transmits the command code @RR. Clicking the "Up 1 Row" button in the area 1018 or pressing the PAGE UP key calls a function cmdUp_Click, which generates and transmits the command code @UU (block 1717). Clicking the "Down 1 Row" button in the area 1018 or pressing the PAGE DOWN key calls a function cmd-Down_Click, which generates and transmits the command code @DD (block 1718).

One type of message data is generated as follows. Clicking the "Send" button 1022 or pressing the Return key calls a function cmdSend_Click, which in turn calls a Send_Message subroutine (block 1719). The subroutine Send_Message transmits a code @MG and the message text from the message window 1008.

Other types of status and message data are generated as follows (not shown). Periodically the control program generates and transmits the command code @ID and a value for a customer name parameter, which is displayed by the bridge program in window 1112 (FIG. 11). Periodically the control program generates and transmits the command code @VR along with certain parameters such as the identity of the active captioner, the identities of the standby captioners, the status of the audio and video hookups, and so forth. Other command codes are generated during authentication, such as a login challenge command code @CH and a random number parameter, a challenge passed command code @LO, a challenge failed command code @ER, an added captioner placed-on-standby command code @SB, and an added captioner made active command code @AC.

FIG. 18 is a flowchart of a process 1800 in the bridge program for generating caption data that incorporates CP control data so that the caption and a banner may be displayed together without interference (FIG. 5). The process 1800 includes connecting to a standard captioning program (block 1802). It will be appreciated that if an improved captioning program that incorporates functions of the bridge program is used, no connection to a captioning program is necessary. The process 1800 also includes connecting to the control program (block 1804). Any suitable connection may be used, including internet protocol and modem. The authentication operation is performed (block 1806) and upon authorization, connection types such as captioning and control, audio and video are set and the captioner's name is sent (block 1808). If the bridge is in captioning and control mode, its state is updated with information from a variable dump from the control program (block 1810). The updating is particularly useful when the captioner is taking over as the active captioner and the state of the bridge program must be set so that any repositioning done by the program director is maintained. As the caption data is received from the captioning program, preferably ASCII data is generated (block 1812) by stripping out the control codes from the caption data.

If the bridge program is in ASCII mode (block 1814—YES), the ASCII data is output from the bridge program (block 1820). The bridge program may also be placed in other modes (not shown) such as standard closed captioning and special modes.

If the bridge program is in captioning and control mode (block 1816—YES) and a command code from the control program is detected (block 1830—YES), a determination is made as to whether the command code is an instruction to generate a preamble address code. If the command code is an instruction to generate a new preamble address code (block 1832—YES), a new preamble address code is generated from the command code (block 1834) and is substituted for an existing preamble address code in the caption data (block 1836). If the command code is not an instruction to generate a new preamble address code (block 1832—NO), it is suitably processed (block 1838). Caption data is then output (block 1840), whether the original caption data (clock 1830—NO or block 1838), or caption data in which a new preamble address code is substituted (block 1836).

The bridge program, improved captioning program, and control program may be programmed in any desired manner, including script-based programming techniques as well as object-oriented programming techniques. Any desired distribution technique may be used for furnishing software to the broadcast station computer 634 as well as to the captioner computers 612 and 712, including such well known techniques as providing the applications on computer-readable media in a variety of ways, such as in firmware, preinstalled software, software loaded from a storage medium, including magnetic storage media such as diskette, tape and fixed disk, semiconductor storage media such as various types of flash memory cards, and optical storage media such as CD-ROM and DVD-ROM, and software downloaded from a server over a network, including local and wide area networks and the Internet. Scripts and short code segments furnished to general purpose browsers may also be downloaded from a server over a network.

The scope of our invention is set forth in the following claims. The description of the various embodiments set forth herein is illustrative of our invention and is not intended to limit the scope thereof. Variations and modifications of the embodiments disclosed herein will become apparent to those of ordinary skill in the art upon reading this patent document, and alternatives to and equivalents of the various elements of the embodiments will be known to those of ordinary skill in the art. These and other variations and modifications of the embodiments disclosed herein may be made without departing from the scope and spirit of the invention as set forth in the following claims.

The invention claimed is:

1. An apparatus for enabling a user thereof to exert control of various closed caption display aspects of caption text, comprising:
   a user input component for generating a plurality of selectively operable control elements respectively representative of the closed caption display aspects;
   a component responsive to the selective operation of any of the control elements for generating first control data corresponding to at least one of the closed caption display aspects;
   a first output for supplying the control data apart from the caption text;
   a first input for receiving external caption data comprising the caption text and second control data, the second control data including portions obtained from the first control data; and
   a second output for supplying the caption data received at the first input in a substantially unaltered form.

2. A closed captioning encoder, comprising:
   a non-transitory memory having stored therein a first program; wherein the first program comprises instructions for:
      receiving at least one improved control data command specifying at least one or more display aspects of one or more closed captioning characters; and
      outputting in a caption encoded signal the one or more closed captioning characters and the at least one improved control data command;
      whereupon a programming originator computer can monitor and control at least one of a size and a placement of the one or more closed captioning characters relative to a video signal and prior to outputting of the caption encoded signal based on at least one command present in the at least one improved control data command; and a processor operable to execute the first program.

3. The closed captioning encoder of claim 2, wherein the at least one improved control data is generated by a first captioning computer based on at least one second improved control data command generated by the programming originator computer.

4. The closed captioning encoder of claim 2, wherein the at least one improved control data is generated by a first captioning computer based on at least one second improved control data command generated by the first captioning computer.

5. The closed captioning encoder of claim 2, wherein the at least one improved control data command is generated by a first captioning computer and overrides at least in part one or more second improved control data commands generated by the programming originator computer.

6. The closed captioning encoder of claim 2, wherein the at least one improved control data command is generated by the programming originator computer and overrides at least in part one or more second improved control data commands generated by a first captioning computer.

7. The closed captioning encoder of claim 2, wherein the programming originator computer is communicatively coupled to the encoder via the Internet and the closed captioning encoder comprises at least one communications port operable for communicating, over the Internet, with the programming originator computer.

8. The closed captioning encoder of claim 2, wherein the non-transitory memory stores therein a control program further comprising instructions for transferring captioning responsibility between a first captioning computer and a second captioning computer.

9. The closed captioning encoder of claim 8, wherein transfer of captioning responsibility from the first captioning computer to the second captioning computer occurs under the direction of a handoff command generated by the programming originator computer.

10. The closed captioning encoder of claim 8, wherein transfer of captioning responsibility from the first captioning computer to the second captioning computer occurs automatically.

11. The closed captioning encoder of claim 9, wherein the instructions for transferring captioning responsibility between the first captioning computer and the second captioning computer include instructions responsive to receipt of a seize request from the second captioning computer.

12. The closed captioning encoder of claim 10, wherein transfer of captioning responsibility from the first captioning computer to the second captioning computer occurs seamlessly.

13. The closed captioning encoder of claim 9, wherein the instructions for transferring captioning responsibility between the first captioning computer and the second captioning computer include instructions responsive to receipt of a transfer request from the programming originator computer.

* * * * *